US011803638B2

(12) United States Patent
Favor

(10) Patent No.: US 11,803,638 B2
(45) Date of Patent: Oct. 31, 2023

(54) MICROPROCESSOR CORE WITH A STORE DEPENDENCE PREDICTOR ACCESSED USING A TRANSLATION CONTEXT

(71) Applicant: Ventana Micro Systems Inc., Cupertino, CA (US)

(72) Inventor: John G. Favor, San Francisco, CA (US)

(73) Assignee: Ventana Micro Systems Inc., Cupertino, CA (US)

( * ) Notice: Subject to any disclaimer, the term of this patent is extended or adjusted under 35 U.S.C. 154(b) by 194 days.

(21) Appl. No.: 17/185,802

(22) Filed: Feb. 25, 2021

(65) Prior Publication Data

US 2022/0027460 A1    Jan. 27, 2022

Related U.S. Application Data

(63) Continuation-in-part of application No. 16/937,392, filed on Jul. 23, 2020.

(51) Int. Cl.
*G06F 21/54*      (2013.01)
*G06F 21/55*      (2013.01)
(Continued)

(52) U.S. Cl.
CPC .......... *G06F 21/54* (2013.01); *G06F 9/30043* (2013.01); *G06F 9/30047* (2013.01);
(Continued)

(58) Field of Classification Search
CPC .. G06F 21/54; G06F 9/30043; G06F 9/30047; G06F 9/3842; G06F 21/554; G06F 21/556; G06F 21/755
See application file for complete search history.

(56) References Cited

U.S. PATENT DOCUMENTS 10,929,141 B1    2/2021   Kaplan et al.
11,231,931 B1*   1/2022   Puthoor ............... G06F 9/3806
(Continued)

OTHER PUBLICATIONS

Abu-Ghazaleh, Nael et al. "How the Spectre and Meltdown Hacks Really Worked." IEEE Spectrum. Downloaded on Nov. 24, 2019 from https://spectrum.ieee.org/computing/hardware/how-the-spectre-andmeltdown-hacks-really-worked. pp. 1-10.
(Continued)

*Primary Examiner* — Daniel B Potratz
*Assistant Examiner* — Arif Khan
(74) *Attorney, Agent, or Firm* — E. Alan Davis; Huffman Law Group, PC

(57) ABSTRACT

In order to mitigate side channel attacks that exploit speculative store-to-load forwarding, a store dependence predictor is used to prevent store-to-load forwarding if the load and store instructions do not have a matching translation context (TC). In one design, a store queue (SQ) stores the TC—a function of the privilege mode (PM), address space identifier (ASID), and/or virtual machine identifier (VMID)—of each store and conditions store-to-load forwarding on matching store and load TCs. In another design, a memory dependence predictor (MDP) disambiguates predictions of store-to-load forwarding based on the load instruction's TC. In each design, the MDP or SQ does not predict or allow store-to-load forwarding for loads whose addresses, but not their TCs, match an MDP entry.

24 Claims, 8 Drawing Sheets

(51) Int. Cl.
*G06F 9/38* (2018.01)
*G06F 9/30* (2018.01)

(52) U.S. Cl.
CPC .......... *G06F 9/3842* (2013.01); *G06F 21/554* (2013.01); *G06F 21/556* (2013.01)

(56) References Cited

U.S. PATENT DOCUMENTS

| | | |
|---|---|---|
| 2011/0055484 A1 | 3/2011 | Eichenberger et al. |
| 2011/0153986 A1 | 6/2011 | Alexander et al. |
| 2012/0239904 A1 | 9/2012 | Ekanadham et al. |
| 2014/0108862 A1* | 4/2014 | Rafacz ............... G06F 9/3842 712/225 |
| 2014/0380023 A1* | 12/2014 | Smaus ............... G06F 9/3838 712/216 |
| 2015/0006452 A1* | 1/2015 | Kim ............... G06F 9/3834 706/21 |
| 2016/0292075 A1 | 10/2016 | Mohan |
| 2017/0147346 A1 | 5/2017 | Hornung et al. |
| 2017/0286315 A1* | 10/2017 | Mukherjee ........ G06F 12/1063 |
| 2019/0114422 A1* | 4/2019 | Johnson ............ G06F 9/30105 |
| 2019/0138720 A1 | 5/2019 | Grewal et al. |
| 2019/0227803 A1 | 7/2019 | Mukherjee et al. |
| 2019/0310845 A1 | 10/2019 | Ramani et al. |
| 2020/0133679 A1 | 4/2020 | Brandt et al. |
| 2020/0272474 A1 | 8/2020 | Gabor et al. |
| 2020/0364152 A1 | 11/2020 | Park et al. |
| 2020/0401441 A1 | 12/2020 | Evans et al. |
| 2021/0049015 A1* | 2/2021 | Chou ............... G06F 9/3861 |
| 2021/0081575 A1 | 3/2021 | Saileshwar et al. |
| 2021/0157590 A1 | 5/2021 | King et al. |
| 2021/0157597 A1 | 5/2021 | Grubisic |
| 2021/0200552 A1 | 7/2021 | Liu et al. |
| 2021/0248084 A1 | 8/2021 | Mendelson et al. |
| 2021/0303303 A1 | 9/2021 | Schuttenberg et al. |
| 2021/0365554 A1 | 11/2021 | Sakalis et al. |
| 2022/0027459 A1 | 1/2022 | Favor et al. |
| 2022/0027467 A1 | 1/2022 | Favor et al. |
| 2022/0027468 A1 | 1/2022 | Favor |

OTHER PUBLICATIONS

Fruhlinger, Josh. "Spectre and Meltdown Explained: What They Are, How They Work, What's at Risk." CSO Online. Downloaded on Nov. 24, 2019 from https://csoonline.com/article/3247868/spectre-and-meltdown-explained-what-they-are-how-they-work-whats-at-risk.html pp. 1-10.

"Frogh, Anders et al. Wrangling the Ghost: An Inside Story of Mitigating Speculative Execution Side Channel Vulnerabilities." Microsoft. Downloaded on Nov. 24, 2019 from https://i.blackhat.com/us-18/Thu-August-9/us-18-Fogh-Ertl-Wrangling-with-the-Ghost-An-Inside-Story-of-Mitigating-Speculative-Execution-Side-Channels-Vulnerabilities.pdf. pp. 1-44.

Intel Analysis of Speculative Execution Side Channels. White Paper. Revision 1.0. Jan. 2018. Document No. 336983-001. pp. 1-12.

Cache Speculation Side-Channels. Whitepaper. Arm Limited. Version 2.4. Oct. 2018. pp. 1-21.

Kocher, Paul et al. "Spectre Attacks: Exploiting Speculative Execution." Submitted on Jan. 3, 2018. Cornell University, Computer Science, Cryptography and Security. arXiv.org<cs<arXiv:1801.01203. pp. 1-19.

Yarom, Yuval et al. "Flush+Reload: a High Resolution, Low Noise, L3 Cache Side-Channel Attack." The University of Adelaid. Computer Science, IACR Cryptol. ePrint Arch. 2013. pp. 1-14.

Ge, Qian et al. "A Survey of Microarchitectural Timing Attacks and Countermeasures on Contemporary Hardware." *Journal of Cryptographic Engineering 8,* Apr. 2018. pp. 1-37.

Lipp, Moritz et al. "Meltdown: Reading Kernel Memory from user Space." 27th USENIX Security Symposium. Aug. 15-17, 2018. Baltimore, MD, USA. pp. 973-990 ISBN 978-1-939133-04-5.

* cited by examiner

MICROPROCESSOR CORE WITH A STORE DEPENDENCE PREDICTOR ACCESSED USING A TRANSLATION CONTEXT

RELATED APPLICATIONS

This application is a continuation-in-part of U.S. patent application Ser. No. 16/937,392, filed Jul. 23, 2020, which is herein incorporated by reference.

FIELD OF INVENTION

This disclosure relates to side channel attacks, and more particular to store-to-load-forwarding side channel attacks.

BACKGROUND

This application is directed to mitigating side channel attacks (SCAs) on speculative store-to-load forwarding from a shared microarchitectural memory resource known as a store queue (SQ). The following paragraphs explain the purpose of the SQ and store-to-load forwarding and explain how they are vulnerable to a certain type of hack known as a SCA.

Before elaborating on the background art, it is helpful to define some terms and concepts. A load instruction loads data from memory into a register. "Load data" refers to the data being loaded into the register. A store instruction stores data from a register to memory. "Store data" refers to data in the register being stored to memory. A "load data address," "load address," "store data address," or a "store address" refers to the memory address of the store or load data, not to the address of the load or store instruction. An "address of the load instruction," "load instruction address," "address of the store instruction," or "store instruction address," by contrast, refers to the virtual or physical memory address or program counter (PC) of the load or store instruction. "Store" and "load," when used as a noun, usually constitute shorthand for the store and load instructions themselves, but in some contexts that will be apparent to an ordinarily skilled artisan, they refer to the data being stored or loaded.

In typical high-performance architectures, store data is written into a SQ before being written into the cache and eventually to system memory. A load instruction that is newer than the store instruction may specify a load data address that implicates the store data in the SQ of an older uncommitted store. In a processor that lacks support for store-to-load forwarding, the load instruction has to wait until all older stores have committed and their data written into cache, before executing by reading the data from the cache. Otherwise, the load instruction might load stale data from the cache when the store data is not written to cache in time. But waiting for the store data to be written to the cache before executing the load instruction is inefficient, particularly when that store data is sitting in one of the SQ's entries.

Thus, to increase performance, high-performance processors include logic to speculatively forward uncommitted store data to dependent load instructions before the store instruction is committed, when such store data is sitting in one of the SQ's entries. For store data to be forwarded, the load instruction must have permission to access the data, the store and load addresses must match (i.e., there is a memory dependency between the load and store instructions), and the store-to-load forwarding circuitry needs to determine which SQ entry is holding the store data.

Unfortunately, determining memory dependencies is not as easy as determining whether there is a register dependency between two other instructions. While register dependencies can be determined when instructions are decoded, memory dependencies require knowledge of the memory addresses of the load/store instructions, which are computed using register values that may not be available until the load instruction is ready to begin executing. In some cases, a load instruction may access a SQ with store data entries where the corresponding store data address has not yet been computed. Therefore, a processor can either wait for the store data address to be computed, and also wait until the store and load addresses are verified to match, or it can speculatively forward store data from a store instruction predicted to have the same memory address as the load address.

In some processors, load and store instructions are predicted to have the same physical memory addresses if the lowest 12 untranslated bits of the store and load's virtual addresses match. Additional bits may also be compared, if there is time to do it, to more accurately predict that the physical address match. These processors use the abbreviated set of load memory bits to "cam" into an SQ having a content-addressable memory. This means that a partial load data address is compared with a partial store data address recorded in each SQ entry to find any entries that match. Note that two or more entries could match if two uncommitted store instructions have the same store data address. If there are two or more matching entries, priority encoding logic selects the entry with the most recent store that is older than the load instruction. Because it takes so long (e.g., potentially using a tablewalk) to translate virtual addresses into physical addresses look up permissions associated with a memory address, conventional processors also predict that if the store instruction has the proper instructions to store data at the store address, then the load instruction also has the proper permissions to load data from the load address. On the basis of these predictions or assumptions, store data at the selected SQ entry is speculatively forwarded to the load instruction.

Late in the execution pipeline, the permissions of the load are checked, and the load's freshly computed full physical data address is compared with the store's previously computed full physical data address, which is in the SQ entry. If there is a permission violation or a physical address mismatch, the load is aborted, meaning that the load does not commit and its result is discarded. It will be observed that the camming logic that compares the lowest twelve bits and that selects an SQ entry based on a match with the lowest twelve bits is implicitly predictive of a full physical address match. For purposes of this disclosure, such implicitly predictive logic is described as a kind of "store dependence predictor" (SDP). Another type of SDP is a memory dependence predictor (MDP), which predicts whether store data exists and is forwardable to a given load instruction.

Relying on any prediction or speculation to forward data to a load from an uncommitted store opens the processor to various modes of attack. A possibility exists that a load instruction will have the wrong permissions or a physical address that does not match, causing store data to be misforwarded and speculatively stored in a register specified by the load. This creates a window of opportunity for a "side channel attack" (SCA) to exploit microarchitectural speculation in the processor to break architectural security protections.

An extensive discussion of SCAs is provided in co-pending U.S. patent application Ser. No. 16/937,392, previously identified. The focus of this disclosure is on SCAs that use speculative store-to-load forwarding to temporarily pass data from a store in a victim translation context (TC) to a load in an attacker TC. A TC of an instruction is a function of an address space identifier (ASID), a virtual machine identifier (VMID), and/or privilege mode (PM) that applies to an instruction as it is dispatched to an execution unit.

Store-to-load forwarding SCAs (STL-SCAs) include but are not limited to those that use a load instruction in a virtual machine to read data stored by another virtual machine (different VMIDs) or a hypervisor (different PMs), using a load in a user application to read secret data stored by the operating system (different PMs and ASIDs/PCIDs), and using one user application to read data belonging to another user application (different ASIDs/PCIDs). These are especially pernicious types of attacks because they break barriers between virtual machines, the hypervisor or operating system, and user programs. There are other types of STL-SCAs—namely ones in which both the victim code and the attacker code have the same TC—that are less pertinent to the inventive mitigations described herein.

These SCAs do not work by publishing or recording the data ("victim data") appropriated from the victim store instruction. After all, before any subsequent instructions dependent on the load can publish or store the victim data into memory, an abort process will cancel the load instruction along with any newer instructions that use the victim data. Furthermore, the abort process will invalidate or revert data that the load or newer dependent instructions placed into registers and cache memory. To circumvent the barrier created by the abort process, the SCA uses the mis-speculated data to alter persistent microarchitectural state of a shared memory resource (such as a data cache) so that—after an abort flushes the load instruction and invalidates or reverts data in the load register and shared memory—the attacker can use a store-to-load-forwarding side channel to reconstruct the data from the microarchitectural state.

Setting up such an attack is not necessarily difficult. With knowledge of how a processor's SQ works—e.g., knowing that forwarding is done if the lowest 12 bits of the store and addresses match—an SCA may deliberately construct a load instruction with a load address different from a victim store instruction's load address, but whose compared bits match. Alternatively, an SCA may construct a load instruction with an identical load address as the store address but operating with a different ASID, VMID, TR, and/or PM than the store instruction, in an effort to speculatively pass secret data from a victim store instruction to a malicious load instruction. In a processor employing an MDP, an SCA may use legitimate instructions to mistrain the MDP into mis-predicting that an attacker's load instruction can appropriately access the victim's store data.

After setting up the attack, the SCA exploits a side channel to place traces of the secret data in another shared resource and then reconstructs the secret data using subsequent non-aborting instructions. A side channel is an unintended pathway, such as a cache, branch predictor, translation lookaside buffer (TLB), SQ, or other shared hardware resource that can be exploited to leak information from one software program (a victim program) to another (the attacker program).

A principal example of an SCA is a flush-and-reload attack on the cache. After an SCA load instruction loads victim data into a register, 256 selected cache lines are flushed for a first byte of the victim data. A second SCA load instruction constructs a second load address based on a combinatorial function of the first victim data byte, such as a product of the ASCII value of the first victim data byte and a multiplier. The second load instruction pulls in arbitrary data at the second load address into one of the 256 cache lines. The SCA does not use the arbitrary data, or care what it is, but later in the attack it identifies which of the 256 selected cache lines the arbitrary data was pulled into. To make the attack effective, the combinatorial function and the selection of 256 particular cache lines or the attack are engineered to ensure that the first byte of the victim data will effectively index into the 256 selected cache lines, determining a unique one of the 256 cache lines into which the arbitrary data is stored.

The SCA depends on the anticipation that the steps to this point will complete before the SCA load instruction is aborted and that the abort will not change the tag associated with the cache line that contains the victim data. After the first and second load instructions are aborted, even newer SCA instructions—which do not directly use the victim data, violate any permissions, and are destined to commit without abort—probe each the 256 previously flushed entries. These SCA instructions use the same combinatorial function as that used by the second SCA load instruction, except that index numbers from 0 to 255 are used in place of the first byte of victim data. By comparing how long each probe takes, the SCA identifies which cache line entry contained the arbitrary data—which should correspond to the fastest probe.

By determining the location of the cache line entry, the attack knows what value the first victim data byte must have been in order to pull the arbitrary data into that cache line. The foregoing steps, from the store instruction storing the victim data to the determination of the first victim data type, are re-executed for each secret victim data byte until the victim data is reconstructed in full.

What is needed is processor and method that at least mitigates the probability that an STL-SCA can exploit speculative store-to-load forwarding between a store instruction in a store TC and a load instruction in the attacker's TC, assuming that the TC's are different.

SUMMARY

Embodiments are provided of methods to mitigate side channel attacks (SCAs) that exploit store-to-load forwarding operations on a pipelined, speculative out-of-order execution processor. The method comprises using an identifier and translation context (TC) of a load instruction to access a store dependence predictor that predicts whether store data is or will be available and forwardable to the load instruction and generating, by the store dependence predictor, a signal that reflects said prediction of whether store data is or will be available and forwardable to the load instruction. The TC comprises an address space identifier (ASID), a virtual machine identifier (VMID), a privilege mode (PM) or a translation regime (TR), a combination of two or more of the ASID, VMID, and TR or PM, or a hash and/or subset of the ASID, VMID, and/or TR or PM.

The predictive aspect of the store dependence predictor is implementation dependent. In one implementation, the store dependence predictor is predictive, at least in part, because the prediction is made before making a full data address comparison of the load instruction with one or more outstanding store instructions. In another implementation, the store dependence predictor is predictive, at least in part, because the prediction is made before verifying that the load instruction has permission to access the store data.

In one implementation, the method further comprises using the TC to determine which entry in the store dependence predictor to store, increment or decrement a confidence value associated with the load instruction. In another implementation, the signal selects between forwarding of the store data to the load instruction and not forwarding of the store data to the load instruction. In an alternative implementation, the signal selects between accessing and not accessing a store queue to forward the store data.

In yet another implementation, the store dependence predictor comprises a store queue and the generated signal comprises a signal that selects between forwarding of the store data to the load instruction and replaying, retrying or stalling the load instruction to load the store data from a cache.

The store dependence predictor may be accessed with an index and/or tag, wherein the index and/or tag are generated by hashing or concatenating the TC with other information. In one implementation of the method, a TC of the load instruction is used to access a store dependence predictor comprises comparing a TC indicated by an index, tag or entry of the store dependence predictor with the TC of the load instruction. In this implementation the comparison of a TC involves comparing a hash of the TC with other information and/or concatenating the TC with other information.

In another implementation of the method, the store dependence predictor comprises a memory array. Use of a TC of the load instruction to access a store dependence predictor comprises hashing or concatenating the TC of the load instruction with an instruction address of the load instruction to generate an index into the store dependence predictor memory array.

In another implementation of the method, the store dependence predictor comprises a content-addressable memory that holds TCs and data addresses of each of a plurality of store instructions. The predicting of whether a load instruction will successfully execute and commit by speculatively forwarding uncommitted store data comprises determining whether the TC of the load instruction matches the TC of any of the store instructions.

Embodiments are also provided of a processor that mitigates side channel attacks that exploit speculative store-to-load forwarding in a processor. According to some of these embodiments, the processor comprises a store dependence predictor that predicts whether store data is or will be available and forwardable to a load instruction. The store dependence predictor is accessible using an identifier and translation context (TC) of a load instruction and generates a signal that reflects said prediction of whether store data is available and forwardable to the load instruction. The TC definition set forth for the method embodiments discussed above is applicable to these apparatus embodiments.

The store dependence predictor is predictive, at least in part, because the prediction is made before making a full data address comparison of the load instruction with the store instruction and/or because the prediction is made before verifying that the load instruction has permission to access the store data.

In one implementation, the processor further comprises update logic associated with the store-dependence predictor (SDP) that updates the SDP based on whether a load instruction speculatively forwarded data from a store instruction, whether the foregoing act or its absence was correct. The update logic may use the TC to access the SDP in order to perform said updates. For example, the SDP may compare a TC associated with an entry of the SDP with the TC of the load instruction. Alternatively, the SDP may be accessible by a hash or concatenation of the TC of the load instruction with an instruction address of the load instruction.

In one implementation, the prediction signal output by the SDP selects between forwarding of the store data to the load instruction and not forwarding of the store data to the load instruction. In another implementation, the prediction signal selects between accessing and not accessing a store queue to forward the store data. In yet another implementation, the SDP comprises a store queue and the generated signal comprises a signal that signals whether there was at least one entry in the store queue containing a TC and data address that matches that of the load instruction.

More generally, in one implementation, for whatever purpose the SDP may be accessed, it is accessed with an index and/or tag using a TC of the load instruction. In a more specific implementation, the index and/or tag are generated by hashing or concatenating the TC with other information.

In one implementation, the SDP comprises a content-addressable memory that holds TCs of each of a plurality of store instructions. The prediction output by the SDP is reflective of whether the TC of the load instruction matches the TC of any of the store instructions.

In a more particular implementation, the SDP comprises a store queue comprising a plurality of entries that are selectable. The store queue is a content addressable memory that is accessed by camming the TC and a data address, or portion or derivative thereof, against the plurality of entries of the store queue.

Yet another embodiment is designed for licensing of architectural specifications and instructions for implementing a processor. Many microprocessor companies, including for example ARM Holdings, where ARM was previously an acronym for Advanced RISC Machines, do not make or sell the processors they invent, but they license their architectural designs. A similar purpose is served by an embodiment in which a non-transitory computer-readable medium is provided having instructions stored thereon that are capable of causing or configuring a processor for mitigating side channel attacks in accordance with any of the embodiments or implementations discussed above.

DETAILED DESCRIPTION

Figure 1:
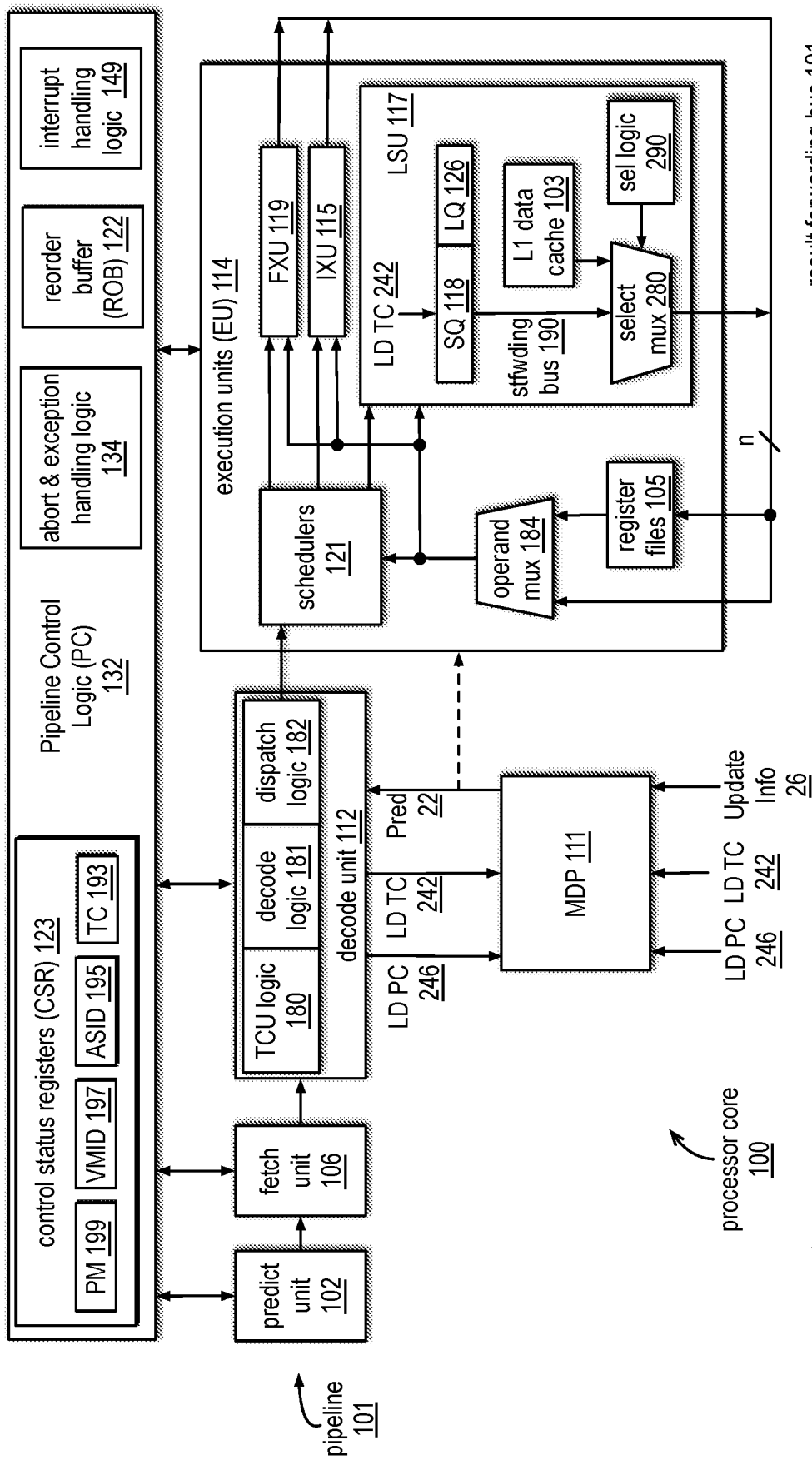
FIG. 1 illustrates one embodiment of a pipelined superscalar, out-of-order execution microprocessor core that performs speculative store-to-load forwarding.

As may be observed from the foregoing, store-to-load forwarding SCAs (STL-SCAs) prey on processors that engage in store-to-load forwarding. However, store-to-load forwarding significantly improves processor performance. Therefore, high performance processors continue to engage in store-to-load forwarding. This disclosure mitigates STL-SCAs by using the translation context (TC) to condition store-to-load forwarding on conditions associated with a TC update. Before detailing the illustrated embodiments, an explanation of TCs follows.

Processor cores described herein provide virtual memory support. Each process, or thread, running on the core may have its own address space identified by an address space identifier (ASID). The core may use the ASID to perform address translation. For example, the ASID may be associated with the page tables of a process. A TLB (not shown) may include the ASID in their tags in order to distinguish entries for different processes. In the x86 ISA, for example, an ASID may correspond to a processor context identifier (PCID). The core also provides machine virtualization support.

Also, each virtual machine running on the core has its own virtual machine identifier (VMID). A translation lookaside buffer (TLB) may include a VMID in its tags in order to distinguish entries for different virtual machines. The VMID is used to identify pages or TLB entries associated with a particular VM so that when the VM is terminated, the processor can flush only those pages or entries used by a particular VM.

Furthermore, conventional processor cores provide different privilege modes (PM), or privilege levels. The PM of a core determines, among other things, whether or not privileged instructions may be executed. For example, in the x86 ISA there are four PMs, commonly referred to as Ring 0 through Ring 3. Ring 0 is also referred to as Supervisor level and Ring 3 is also referred to as User level, which are the two most commonly used PMs. For another example, in the RISC-V ISA, PMs may include Machine (M), User (U), Supervisor (S) or Hypervisor Supervisor (HS), Virtual User (VU), and Virtual Supervisor (VS). In the RISC-V ISA, the S PM exists only in a core without virtualization supported or enabled, whereas the HS PM exists when virtualization is enabled, such that S and HS are essentially non-distinct PMs. For yet another example, the ARM ISA includes three PMs: application (PL0), operating system (PL1), and hypervisor (PL2).

A useful abstraction of the PM is the translation regime (TR), which is derived from the PM. The TR distinguishes between subsets of modes, i.e., M versus S/U versus VS/VU. In one implementation, these subsets correspond with translation requirements. For example, in a RISC-V embodiment, the U and S privilege modes (or U and HS, when the hypervisor extension is active) may share a first TR in which one level of translation is required based on the ASID, VU and VS share a second TR in which two levels of translation are required based on the ASID and VMID, and M privilege level constitutes a third TR in which no translation is performed, i.e., all addresses are physical addresses.

In one embodiment, a TC of an instruction is the TC of the core (or a hardware thread in the case of a multi-threaded core) that applies to the instruction when it is dispatched from a decoder to an execution unit. In another embodiment, the TC of an instruction is the TC of the core when the instruction is executed.

As used in this description, a TC of an instruction is a function of the ASID, VMID, and/or PM of the instruction, meaning that the TC comprises at least an ASID, VMID, PM, or TR, a combination of two or more of the ASID, VMID, and TR or PM, or a hash and/or subset of the ASID, VMID, and/or TR or PM. For purposes of this definition, a process context identifier (PCID) and any other equivalents from other architectures constitutes an ASID. Various architectures may substitute other labels and acronyms for ASID, VMID, PM or TR, so these acronyms should be constructed to cover any substantially functionally equivalent value or representation, wherein the term "substantially"—as in contracts and other legal contexts—means being the same, equivalent in function, or very similar with respect to its salient traits.

For example, in one embodiment, the TC may consist only of the ASID, only of the VMID, or only of the PM. In an alternative embodiment, the TC comprises a combination of two of the ASID, VMID, and PM. In another embodiment, the TC consists of combinations of two or more of the ASID, VMID, and/or PM in which only a portion or portions of at least one of the two or more of the ASID, VMID, and/or PM are used. For example, because the ASID and VMID are conventionally represented by a large number of bits, comparing the entirety of those bits may result in unacceptable delay, creating a critical path.

Comparisons using the full TC—one which includes full copies of the ASID, VMID, and/or PM or TR or a lossless derivative from which the ASID, VMID and/or PM or TR can be reconstructed—are expensive, as the ASID has as many as 9 bits (per the RISC-V architecture) and the VMID has as many as 14 bits (also depending on the architecture or platform). Therefore, it is desirable to construct a smaller TC that can be used to access a shared microarchitectural resource faster. In one embodiment, only strategic portions of the ASID and/or VMID are used to construct a TC, such that it is still predictable in practice, but not guaranteed, that no TCs constructed from two different ASID and/or VMID values will be the same. In another embodiment, the TC is not differentiated on a one-to-one basis with the PM, but rather on a one-to-one basis with the TR.

In another embodiment, the TC comprises a n-bit hash of the ASID, VMID, TR, and/or PM, or one or more portions thereof, wherein n is less than the total number (i.e., less than complete subset) of bits representing the ASID, VMID, TR and/or PM. The construction of the TC may also incorporate other inputs—such as a return address (RA) on the top of the stack of a return address predictor—to further differentiate load addresses in a way that produces even more accurate predictions. All of the foregoing TC embodiments described above are encompassed by the simple definition of the TC as being a function of the ASID, VMID, TR, and/or PM of the instruction.

A TC update occurs when an instruction that expressly updates the TC, or some component thereof, is dispatched. A TC update also occurs when an instruction that will cause an exception executes.

Figure 2:
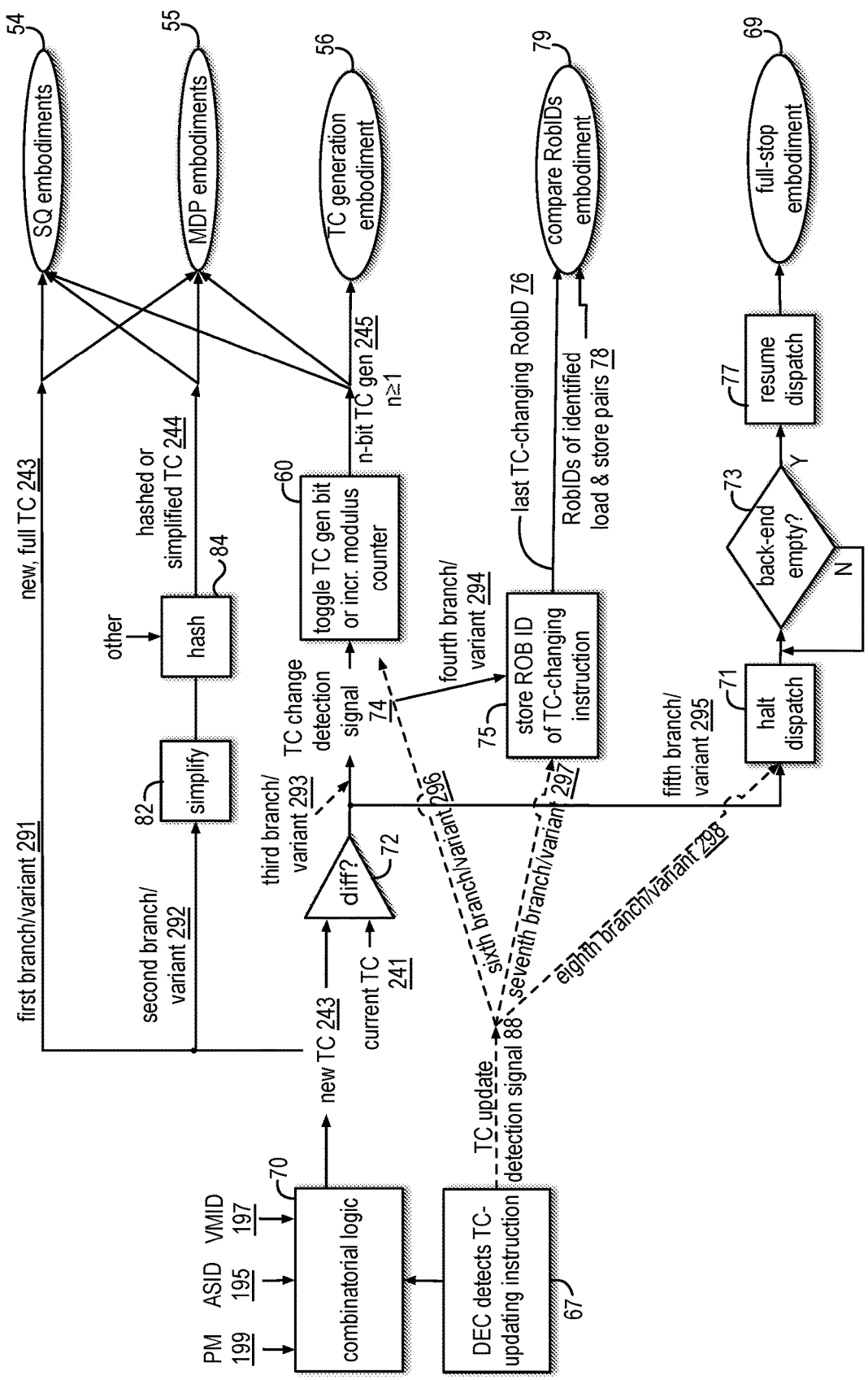
FIG. 2 diagrams several different embodiments for conditioning store-to-load forwarding on a TC.

Orthogonal to these two categories is the decision whether to treat all potential, or only actual, changes to the TC as TC updates. For purposes of the subsequent description, the term "TC update" can refer to either characterization, unless the context renders only one of these characterizations meaningful. For example, FIG. 2 illustrates a TC change detecting signal 74 being derived from a comparison of a new TC 243 with the current (up until it loses its incumbency) TC 241. In this context, a "TC update" takes only the broader of the two characterizations described herein.

An instruction that causes a TC update may either cause it before the instruction (in place of the instruction itself, which gets aborted), or after the instruction (as a result of the instruction successfully executing or because of an abort that flushes all following instructions but not this instruction). If the instruction executes without an abort, then the update occurs at the end (aka right after) the instruction. If there is an abort (e.g. for an exception resulting from the instruction), then depending on whether it is a pre-op or post-op abort, the TC update effectively happens before or after the instruction. In the case of an abort that goes to an exception handler, the TC update is part of switching to the PM of the handler. The handler starts executing under the new TC. The later return from the handler and its PM to the original code and its PM, is irrelevant.

There are additional values associated with the ASID, VMID, TR, and/or PM that serve the same purpose as using the full TC. One of these values is an n-bit "TC generation" value to distinguish consecutive TCs in program order. As used in this specification, "program order" is the order in which instructions would be dynamically executed by an in-order processor. This is not to be confused with "static program order," which is the "order" (in memory) in which instructions are set forth in a program of instructions.

A TC generation value represents the TC that is in effect for all instructions in between two TC boundaries. Stated equivalently, a TC generation value represents the TC that is in effect for all instructions in between two TC instructions and, depending on the circumstances, including one or both of the two TC-updating instructions themselves, in program order. For example, the TC generation value of an exception-causing load or store instruction would be the TC generation introduced by the most recently preceding TC-updating instruction, based on program order. Here, the term "introduced" refers to the TC generation value "specified" or "caused" by the TC-updating instruction. Any ultimately executed instruction is associated with a TC generation value based upon its position in program order. This TC generation value is maintained for each successive instruction until there is another TC-updating instruction.

Each TC update triggers a new generation. The n in n-bits could be a single bit, which would only distinguish consecutive TCs. Or the n could be two or three bits, to represent 4 or 8 TC generational values, respectively, that repeat with every 4 or 8 TC updates. Another TC-associated value is a RobID value corresponding to the most recent TC-updating instruction. The current RobID value is updated every time there is a TC update. As explained with respect to FIGS. 11-12, this RobID, like the full TC, can be used to condition store-to-load forwarding.

A "current TC generation value" refers to the TC generation value associated with an instruction at decode or dispatch. The "current TC generation value" is maintained at some decode or dispatch pipe stage and has meaning only with respect to instructions as they pass through that pipe stage. Stated another way, the TC generation value associated with an instruction currently being processed is the TC that was in effect at some implementation-dependent location in the pipeline where the instruction was processed in program order. In a typical embodiment, the selected stage is the dispatch logic 182 of the decode unit 112, and the "time" is the time at which an instruction is dispatched. In some embodiments, the selected stage is before than the dispatch logic 182 and the "time" is earlier than the time the instruction is dispatched. In other embodiments, the selected stage is after the dispatch logic 182 and the "time" is after (most likely, immediately after) the time the instruction is dispatched, but before instructions are scheduled or processed for out-of-order execution. For example, in one implementation, this location in the pipeline is the stage at which instructions are dispatched to one or more schedulers or execution units.

It is possible to be more specific. Applied to typical commercial architectures, store and load instructions would not directly cause TC generation updates. But indirectly, they could cause exceptions that cause TC updates.

Attention is now directed to the terms "predictor" and "store dependence predictor." The term "predictor" is used herein in a sense that probabilistically informed, speculative actions are taken to improve processor performance. This word defines not only the output of processor units expressly described as predictors—for example, a conditional branch predictor, an indirect branch predictor, and return address predictor—but also the implicitly predictive output of other processor elements such as a conventional store queue (SQ).

Embodiments of store forwarding logic described herein are "predictive" of whether uncommitted store data is available to be successfully forwarded to a load instruction because the determination is tentative and speculative, because it may be overridden by subsequent logic or the instruction may be aborted. The tentative determination may be based on some observation of historical store-to-load forwarding patterns and/or possibilities, and/or based on an observed likelihood that uncommitted store data will be available for a load instruction if some portion of the store and load addresses match. Embodiments may be alternatively "predictive" in the sense that it is expected—but not verified until after store data is forwarded—that the full physical store and load addresses match, the load instruction has the proper permissions to access the data, and/or that the load and store instructions will commit, not abort. It is also "predictive" in the sense that only portions or other information-simplifying derivatives of addresses or TCs may be used to access an SDP or shared microarchitectural resource, opening up the possibility of "false positives" where the derivatives constructed from the TC, PC, and/or other bits for two different load/store instructions or TCs match, despite the load/store instructions having one or more differences in the TC and/or PC.

In this disclosure, the structural term "store dependence predictor" (SDP) refers to as any logic that uses metadata (such as an instruction address, data address, or path and/or history information) of a load instruction to generate a signal that predicts—without complete certainty because determinative calculations have not been completed—whether store data is available and forwardable to the load instruction. Also, the SDP produces an output signal that may affect when the scheduler issues the instruction and/or whether store data or cache data will be muxed to the instruction.

An SQ is a type of SDP because a conventional SQ is cammed, and store data is speculatively forwarded, using less than the full load physical data address, and potentially before one or more full store physical data addresses for uncommitted stores have been written to the SQ. An SQ holds store data from uncommitted store instructions until those results are written to the data cache. The SQ has at least one entry for an executing or executed but uncommitted store instruction that is accessed by some identifier (e.g., VA, PC, or derivative thereof) of the load instruction or load address. The SQ predicts that store data of a store instruction in an SQ entry with a store address that partially matches the load address is available and forwardable to the load instruction.

A memory dependence predictor (MDP) is another type of SDP that predicts whether the SQ holds uncommitted store data available to be forwarded to a load instruction. Store data is available to "forward" if it exists in the SQ or if it is identified in an MDP and the load and store instructions satisfy prerequisites—such as but not limited to matching partial store and load data addresses—for forwarding the store data. An instruction is "uncommitted" when it has completed its execution but could be aborted. Commitment of an instruction, by contrast, refers to when the instruction has completed its execution, stored its result in the reorder buffer (ROB) 122, and is at a point where it cannot be aborted.

Circuit elements, such as comparators and logic gates, are depicted and described in various drawings in order to illustrate various functions. All modifications achieving the same functions as disclosed, including the use of analog, photonic, and other processing technologies, are within the scope of this disclosure. Additional modifications to condition the disclosed functions, and/or to achieve additional functions, are also within the scope of this disclosure.

Having completed the foregoing definitional and explanatory context, the drawings are now described in detail. FIGS. 1-12 depict several embodiments of microprocessor logic in which a TC is used to condition store-to-load forwarding. FIG. 1 is a block diagram of one embodiment of a pipelined super-scalar, out-of-order execution microprocessor core 100. The core 100, which may be the only core of a single-core processor or be one of several cores of a multi-cored processor 1000, performs speculative execution of instructions.

The core 100 comprises a multi-stage processor pipeline 101 having a plurality of pipeline units or stages. The processor pipeline 101 includes an instruction fetch unit (IFU) 106, a decode unit (DEC) 112, and execution units (EU) 114, that respectively fetch, decode and execute instructions. Each of these units are controlled by and in two-way communication with the pipeline control logic (PCL) 132.

The PCL 132 regulates and coordinates the advance of instructions through the pipeline 101. It comprises a ROB 122, interrupt handling logic 149 and/or abort-handling logic 134. The PCL 132 also includes control and status registers (CSRs) 123 such as described in co-pending U.S. patent application Ser. No. 17/005,309, filed Aug. 27, 2020, which is herein incorporated by reference. In one implementation, the CSRs 123 hold, among other things, the PM 199, VMID 197, and ASID 195 of the core 100, or one or more functional dependencies thereof (such as the TR and/or TC). In another implementation (e.g., in the RISC-V ISA), the current PM 199 does not reside in a software-visible CSR 123; rather, the PM 199 resides in a micro-architectural register, but is directly readable by a software read of a CSR 123.

In a further implementation, the PCL 132 continuously maintains a current TC 193, which is function of the ASID 195, VMID 197, and/or PM 199, applicable to all instructions currently being dispatched by the dispatch logic 182. Alternatively, the current TC 193 is instead recalculated from the ASID 195, VMID 197, and/or PM 199 when needed.

In one embodiment that controls transitions between TCs, pre-execution units of the pipeline 101, (i.e., PRU 102 through DEC 112) may under some circumstances temporarily operate in a different TC than the EUs 114. In such an embodiment, the core 100 may have CSRs holding a PM 199, VMID 197, and ASID 195 for the pre-execution units and another CSR for the EUs 114.

The execution units 114 comprise at least one scheduler 121, operand mux 184, instruction execution unit (IXU) 115, floating point execution unit (FXU) 119, and load-store unit (LSU) 117. The schedulers 121 issue instructions out of order to the IXU 115, FXU 119, and LSU 117. A result forwarding bus 191 forwards results from each of these units 115, 117 and 119 to one or more register files 105 and operand multiplexers (muxes) 184. The operand muxes 184 select values from the result forwarding bus 191 and register files 105 to feed the operands of the instructions issued to units 115, 117 and 119.

Because the LSU 117 contains the store-to-load forwarding logic, FIG. 1 depicts the LSU 117 in more detail than the other pipeline units. The LSU 117 comprises a level one (L1) data cache 103 and some type of SQ 118 and load queue (LQ) 126 or a unitary store and load queue. It also includes selection logic 290 controlling a select mux 280 that selects one of several inputs, including a store forwarding bus 190 and a cache data bus from the L1 data cache 103, to put data onto a result forwarding bus 191.

FIG. 1 depicts two SDPs—the SQ 118 and an MDP 111. In the implementation shown, the LD TC 242 is used to access both the SQ 118 and MDP 111. But it will be readily apparent that in other implementations, the LD TC 242 may be used to access only one of these two SDPs. It will also be readily apparent that in another implementation, the MDP 111 may be eliminated because it is sufficient to access only the SQ 118 with the LD TC 242.

The SQ 118 holds store results until the store data can be written to the cache 103 and the corresponding store instructions can be committed. Not only address bits but also the TC 242 of the load instruction are used to access and update the SQ 118, as represented by the TC and arrow above the SQ 118 block. The SQ 118 stores both data (i.e., the store data) and metadata (e.g., the TC, at least a portion of an address of the data or store instruction, and a ROB identifier) about the store data and/or store instruction. Likewise, the LQ 126 stores metadata about the load instruction. The LQ metadata indicates whether a store-to-load forwarding operation was correct and succeeded. Additionally, the LQ metadata indicates whether there was any forwardable uncommitted store data for a load for which no forwarding was attempted. If data was mis-speculatively forwarded from an incorrect SQ entry, the LQ metadata identifies a correct SQ entry, if any, providing forwardable store data to a load for which.

The MDP 111 predicts whether store data from an uncommitted store instruction is available to forward to a load instruction. The MDP 111 may be characterized either as a part of the DEC 112, a part of the LSU 117, bridging both the DEC 112 and LSU 117, or as logic existing astride the DEC 112 and LSU 117. During the translation stage, the decode unit 112 accesses the MDP 111 using the PC 246 and TC 242 of a load instruction to obtain a prediction 22 of whether uncommitted store data is available to forward to the load instruction. The PC 246 and TC 242 are used to not only obtain the prediction 22 from the MDP 111 (represented by the arrows above MDP 111 block), but also update the MDP 111 (represented by the arrows below the MDP 111 block). The information 26 used to update the MDP 111 is sourced by or derived from the SQ 118 and LQ 126.

To provide insight into the ordering and timing of certain events of one implementation of the MDP 111, FIG. 1 illustrates the decode unit 112 as comprising translation context update (TCU) detection logic 180, decode logic 181, and dispatch logic 182. The TCU detection logic 180 detects an instruction that updates the TC (which does not necessarily change the TC) for the instruction stream beginning at that instruction. In one implementation, the TCU detection logic 180 also detects instructions that—depending on the TC most recently in force—have the potential of changing the TC. While only block 180 in the DEC 112 is illustrated as containing TCU detection logic 180, in other implementations, one or more other pipeline units (e.g., PRU 102, IFU 106, and/or EUs 114) alternatively or additionally contain TCU signaling logic for signaling an exception, a need for abort, and/or other circumstance requiring a TCU to the PCL 132. Wherever located, some type of TCU logic 180 directly or indirectly detects that an updated TC that will be associated with instructions—and in particular, store and load instructions—advancing through the pipeline 101. It should be noted that as used herein, a TC update may or may not reflect an actual change in the TC.

The decode logic 181 decodes architectural machine instructions into microarchitectural instruction ops ("Ops") that the EUs 114 execute. In one implementation, the MDP 111 is accessed, using the TC, concurrently with the decode and/or translation of an architectural instruction into an Op. Once the DEC 112 discovers that an instruction being decoded is a load instruction, the DEC 112 uses the TC 246 and PC 242 of the instruction to access the MDP 111 to predict whether uncommitted store data can be forwarded to the load. In one embodiment described below, if the prediction is that forwarding is possible, then the MDP 111 also outputs information that predictively identifies which uncommitted store instruction is supplying or has or will supply the store data.

The decode logic 181 is described herein for the purpose of describing when, in an adaptation of a conventional architecture, a load instruction could be discovered and when the MDP 111 may output its prediction. For purposes of describing the SCA mitigations herein, no purpose is served by distinguishing architectural instructions from derivatives thereof, such as Ops. For the sake of brevity, and consistent with widespread colloquial use of the term, the term "instruction" as used herein encompasses both architectural instructions (aka machine instructions) and microarchitectural instructions (aka Ops, micro-operations, and microcode), as well as any synonymous term for an instruction derivative that advances through and is executed by the EUs 114.

The dispatch logic 182 selects an execution unit to execute and instruction and dispatches it, in program order, from the decode unit 112 to a scheduler 121 for the selected unit. If an MDP 111 is present, then the dispatch logic 182 may also dispatch the prediction 22 obtained from the MDP 111. For an MDP 111 sophisticated enough to also predict the location of the store data, an indication of that location may also accompany or be included with the dispatched load instruction.

In one embodiment, the pipeline control logic 132 continuously maintains a current TC 193, which is derivative of the ASID 195, VMID 197, and/or PM 199, applicable to all instructions currently being dispatched by the dispatch logic 182. In one embodiment, it is at decode or dispatch that instructions are identified with (and optionally tagged) a TC 193. More broadly, an instruction can be identified with a TC 193 at any time between instruction dispatch and execution.

Moving on to other structures of the processor core 100, a predict or prefetch unit (PRU) 102 is positioned in front of the fetch unit 106 that is also controlled by and in two-way communication with the PCL 132. The PRU 102, which includes branch predictors that predict program flow, prefetches instructions expected to follow instructions that have already been fetched. The PRU 102 also maintains the program counter (PC). The PRU 102 may also serve other purposes familiar to ordinarily skilled artisans or that the applicant may describe. In one implementation, the PRU 102 calculates an instruction-specific hash of an instruction's TC and PC that accompanies or is linked to the instruction as it advances through the stage registers of the pipeline 101. Alternative implementations use logic associated with the PCL 132 (such as ROB 122 in the PCL 132), decode unit 112, or schedulers 121 to calculate such hashes.

Before advancing to FIG. 2, it is emphasized that many of the elements of FIG. 1 are depicted for context and to provide one example of a specific embodiment to which various novel aspects disclosed herein may be applied. Not all of the depicted structures are necessary, and some elements could be added, combined, substituted and/or eliminated in alternative embodiments. For example, the core 100 may be conventional in most respects but novel in the use of logic that conditions store-to-load forwarding on the store and load TCs being the same, for example by using a TC to access a store dependence predictor (SDP). Other embodiments incorporate alternative and/or additional pipeline units and stages while still using a TC to access an SDP or requiring matching TCs before speculatively forwarding store data.

FIG. 2 is a conceptual overview of several different embodiments for conditioning store-to-load forwarding on a TC, TC update, or TC change. FIG. 2 attempts to group these embodiments according to various features that some embodiments share. For the purpose of visual referencing, eight "branches" are identified. These represent different variants 291-298 of embodiments that condition store-to-load forwarding on a TC, TC update, or TC change.

It will be understood that the embodiments could be grouped in many other ways, and that in presenting FIG. 2, no representation or suggestion is being made on whether or how the embodiments might be characterized as different species of the invention.

All of the variants shown begin with functional block 67, in which the DEC 112 detects a TC-updating instruction, producing a TC update detection signal. For variants 291, 292 and 293, combinatorial logic 70 takes the ASID 195, VMID 197, and/or PM 199 and/or selected bits of the ASID 195, VMID 197 and/or PM 199 and combines and/or operates on them in some fashion to generate the new TC 243. The combinatorial logic 70 may be as simple as a concatenation or interleaving of the inputs. The combinatorial logic 70 may be omitted altogether where the TC is only one of the PM, TR, ASID, and VMID.

For purposes of distinguishing between the first and second branches, FIG. 2 assumes that the new TC 243 is a full (lossless) TC, meaning that the inputs 195, 197, and 199 to the combinatorial logic 70 can be recovered from the TC 243. In other words, the TC 243 is the PM, TR, ASID, and/or VMID or a lossless derivative thereof.

In the first branch or variant 291, the full TC 243 is used to access a store dependence predictor (SDP) such as an SQ 118 or an MDP 111. In the second branch or variant 292, the full TC is simplified (block 82), hashed (block 84), obscured with entropy bits, and/or enhanced with other information such as an instruction address, to produce a derivative TC 244. The derivative TC 244 is a derivative of the full TC 243 and is used in place of the full TC 243 to access a store dependence predictor. A derivative TC 244, for example, could be one that concatenated only some of the bits of the ASID and VMID with the PM or TR. A TC 244 may also be produced by hashing fewer than all of the bits of the ASID, VMID, PM and/or TR, possibly with other information. It should be understood that while FIG. 2 depicts simplifying (block 82) and hashing (block 84) after some combinatorial operation (block 70), the embodiments of this disclosure encompass any order of combinatorial, hashing, simplifying and/or other derivative operations. For example, combinatorial logic 70 could perform the combinatorial, hashing and/or simplifying operations together.

Both the first and second branches or variants 291 and 292 encompass multiple SQ and MDP embodiments 54 and 55. In the SQ embodiment shown in FIG. 3, the SQ 118 provides an extra field 14 for the TC. When executing a store instruction, the TC of the store instruction is copied into the TC field 14. When executing a load instruction, both the load data address and the TC of the load instruction are cammed against the store data addresses and TCs stored in the SQ 118. Store-to-load forwarding will not occur unless, for at least one SQ entry, both the data addresses and the TCs match. An alternative SQ 118 combines the store data address and TC fields 12 and 14. Rather than storing the full store data address and/or TC, the SQ 118 may store and cam combinatorial and/or hash functions of the store and load data addresses and TCs.

Figure 5:
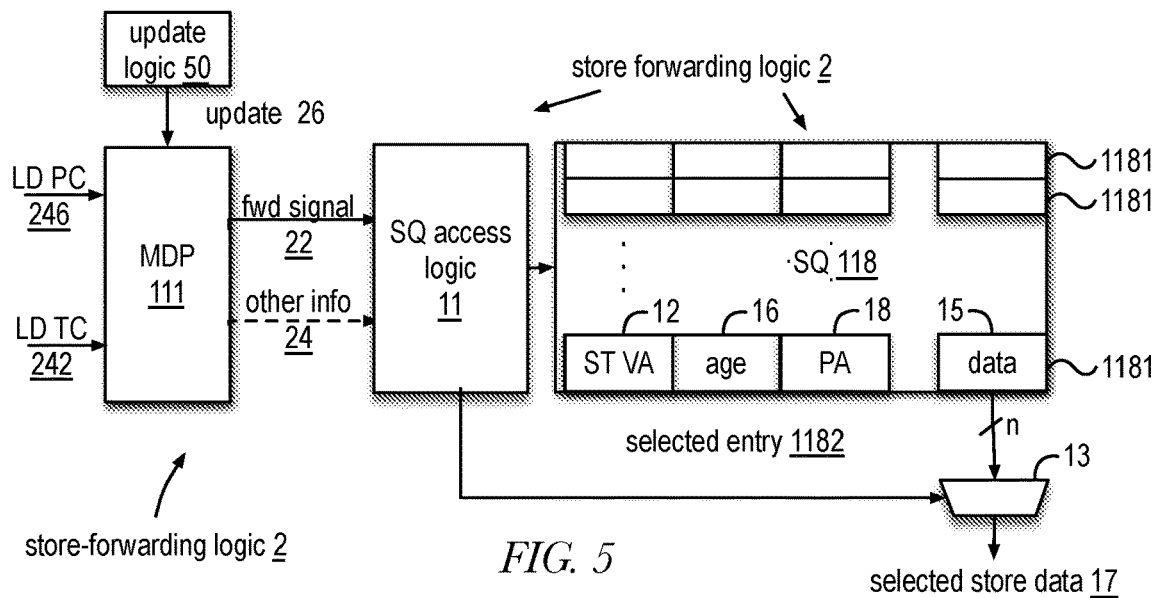
FIG. 5 illustrates one embodiment of a memory dependence predictor (MDP) accessed using a TC of a load instruction in order to prevent store-to-load forwarding across a TC boundary.

In the MDP 111 of FIG. 5, if a load instruction does not have the same TC and PC as a load instruction whose history the MDP stores, then the MDP 111 outputs a forwarding signal 22. The MDP 111 only outputs a prediction of forwarding when a load instruction's TC 242 and PC 246 match the TC and PC of a load instruction already documented by the MDP 111. Stated more generally, if data and/or metadata about a first execution of a load instruction is stored to an MDP 111, then the same load instruction can access that entry for a second execution if and only if the TCs governing the first and second executions of the load instruction are the same. In one embodiment consistent with the first branch 291, the MDP 111 compares PCs separately from TCs. In another embodiment consistent with the second branch 292, the MDP 111 compares combinatorial and/or hash functions of the PCs and TCs.

In the third, fourth, and fifth branches or variants 293-295 of FIG. 2, a comparator 72 compares the new TC 243 with the incumbent TC 241 (i.e., the TC immediately before the new TC) (block 74). Alternatively (but not shown to avoid crowding FIG. 2), the comparator 72 compares some hashed and/or simplified version of the new TC 243 with an identically hashed and/or simplified version of the TC 241.

If they are different, the comparator 72 produces a TC change detection signal 74. Otherwise, no signal is produced. Advantageously, the comparator 72 eliminates the inefficiencies of blocking store-to-load updates that do not actually change the TC.

From production of the TC change detection signal 74, the third, fourth, and fifth branches 293-295 diverge. In branch 293, the TC change detection signal 74 toggles an even/odd bit 60 or advances a multi-bit modulus counter 60, to produce a TC generation tag 245 for the instruction. One embodiment belonging to the third branch 293 is discussed in FIGS. 8-9, where detection of a TC change temporarily prevents execution of newer generation loads until any older-generation stores commit.

In the fourth branch or variant 294, the TC detection signal 74 is sent to the ROB 122 to look up and store (block 75) the RobID of the TC-updating instruction and store it as the last TC-changing RobID 76. RobID logic also associates each store and load instruction loaded into the ROB 122 with the TC 241 or 243 that was in place when it dispatched from the DEC 112. Subsequently, when a load instruction attempts to access a SQ store entry, the RobIDs 78 of the store and load are compared with the last n TC-changing RobIDs 76 (based on how many n TC-changing RobIDs 76 are stored) to determine whether they are both in between the same two consecutive TC boundaries in program order, or if only the last TC boundary RobID 76 is saved, on the same side of the TC boundary identified by the last TC-changing RobID 76. If so, store-to-load forwarding is allowed or permitted, provided that the load instruction passes any other necessary checks (e.g., permissions checks). If not, the load instruction is aborted, retried, replayed, and/or stalled. This fourth branch 294 supports RobID comparison embodiments 56, such as the embodiment of FIGS. 11-12.

In a fifth branch or variant 295, shown along the bottom of FIG. 2, the DEC 112 sends a TC change detection signal 74 to a circuit that responsively stalls dispatch of instructions (block 71), waits for the back end to empty (block 73), and resumes dispatch of instructions (now under the new TC 243) once the back end is emptied (block 77). Breaking blocks 71, 73 and 77 down, the production of the TC change detection signal 74 (or simply at the detection of a TC change), is accompanied by the DEC 112 stalling dispatch of all instructions until any older instructions in the backend (i.e., execution units including schedulers) are completed. Stated another way, the DEC 112 stalls dispatch of instructions until the ROB is emptied. After detecting whether the backend is empty (block 73), the DEC 112 resumes dispatch (block 77).

This fifth branch or variant 295 is functionally equivalent to a 0-bit version of the TC generation field embodiments associated with the third branch 293 and discussed above. There is no generation tracking, just a simple response. This makes the fifth branch 295—second only to the eighth branch 298 discussed below—among the simplest of the embodiments described.

FIG. 2 uses dashed lines to represent the sixth, seventh and eighth branches or variants 296, 297 and 298, respectively. These branches or variants start with the production of a TC update detection signal 88 (instead of from the TC change detection signal 74), and diverge outward to each of units 60, 75 and 71, respectively, bypassing the combinatorial logic 70 and comparator 72. The remainder of the sixth, seventh, and eighth branches or variants 296-298 are identical to the corresponding parts of the third, fourth and fifth branches 293-295, respectively.

Disadvantageously, the sixth, seventh and eighth branches or variants 296-298 trigger temporary impediments to store-to-load forwarding or dispatch for not only TC changes, but also TC updates that do not change the TC. Halting store-to-load forwarding for any TC update, not just TC-changing updates, may result in a performance hit. But this hit may be offset by efficiencies generated in eliminating the TC comparison logic 72. In short, embodiments according to the sixth, seventh, and eighth branches 296-298 eliminate the need for, and delay associated with, combinatorial logic 70 and comparator 72.

In summary, FIG. 2 shows a plurality of ways in which a TC, TC update or TC change can be used to condition store-to-load forwarding.

Figure 3:
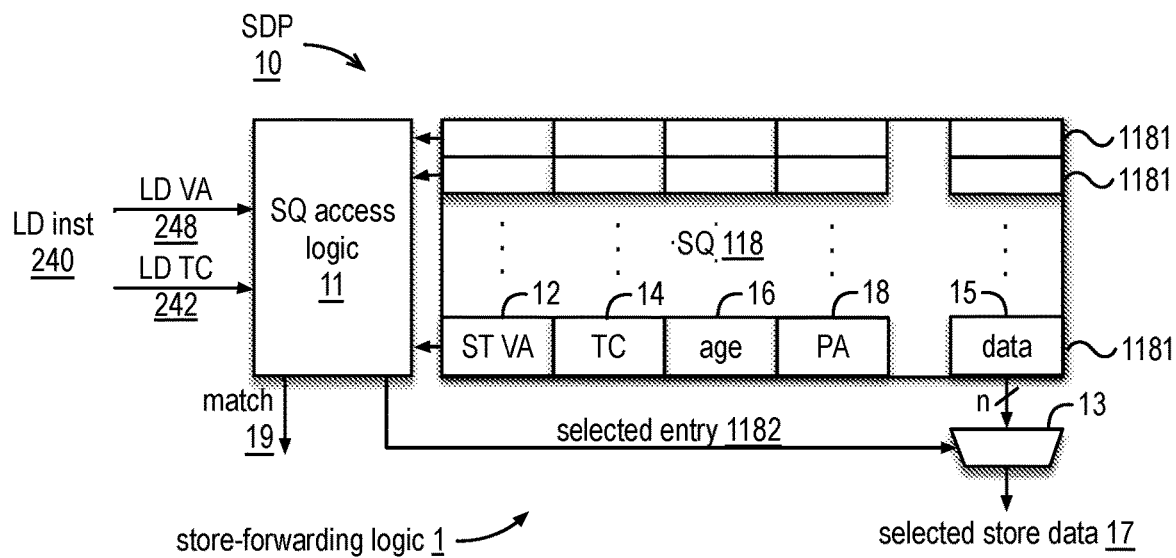
FIG. 3 illustrates one embodiment of a store queue (SQ) that is accessed using a translation context (TC) of a load instruction.

FIG. 3 illustrates a store dependence predictor 10, which is a form of store-forwarding logic 1, that comprises an SQ, SQ access logic 11 for the SQ 118, and a mux 13. The SQ access logic 11 may be considered to be a part of the SQ 118 or appurtenant to the SQ 118. The SQ 118 includes n entries 1181 that temporarily hold the store data 15 of uncommitted store instructions before the store data 15 is written to the cache 103. Each entry 1181 stores a plurality of metadata fields besides the store data 15, including—for example— the virtual address (VA) 12 of the store data 15, the TC 14 of the store instruction associated with the store data 15, and an age 16 of the entry 1181 relative to other SQ entries 1181. In other embodiments, the SQ may have less than all of these fields, e.g., a physical address field without a virtual address field, or a different set of fields.

In one implementation, each entry 1181 also provides a PA field 18 to store a physical address (PA) or derivative thereof once the PA data becomes available from a translation lookaside buffer (TLB) or other source. The PA field 18 may be used to compare physical store and load addresses after a forward occurs but before the load instruction commits. If the PA addresses do not match, then some remediating action, such as a retry (e.g., push instruction back to the scheduler and mark instruction as ready to issue), replay (e.g., push instruction back to the scheduler to await data becoming available), stall (e.g., do not complete execution but wait for store data to become available from cache), and/or abort (e.g., cancel instruction and any newer instructions, re-dispatch after older instructions commit), forces the load instruction to re-execute using the correct load data. In an embodiment that provides for partial physical address matching before the store-to-load forwarding occurs, the PA field can be used to condition and prevent a predicted forward before it happens.

As an aside, it should be noted that various microprocessor designers may use other terms than "retry" and "replay," or define them differently. Claims that refer to instructions being "retried" or "replayed" cover any mechanism of re-inserting the instruction into the instruction stream at any point between and including the decoder and execution stages and re-executing the instruction.

The SQ 118 may be like any conventional SQ, except that each SQ entry 1181 includes a field 14 that stores the TC, or a derivative thereof, of the corresponding store instruction, and the SQ access logic 11 uses both the load address 248, or derivative thereof, and the TC 242 of the load instruction, to look for a matching entry 1181.

In one implementation, the SQ 118 comprises content-addressable memory (CAM), so the SQ access logic 11 compares (cams) the load address, or a portion thereof, with each of the store addresses, or portions thereof, held in the SQ 118. In addition to camming the load address 248 against the SQ 118, the SQ access logic 11 cams the load's TC—or a derivative thereof—against the SQ 118. Accordingly, to find a matching entry 1181 requires that both the store and load's TCs match.

The SQ 118 may have zero, one or multiple entries 1181 with the same TC 14 and VA 12 or derivatives thereof as that of the load. The cam logic 11 produces a signal 19 as a result of the camming. If there is no matching entry 1181, then the cam logic 11 produces a "no match" signal. Otherwise, it produces a "match" signal. If the SQ 118 has multiple matching entries 1181, then priority encoding logic (not shown but which may be incorporated into the cam logic 11) compares the ages 16 of each matching entry 1181 and selects the most recent older matching store entry 1181. The cam logic 11 then outputs a selected entry signal 1182 to control a mux 13 or equivalent logic to output the selected store data 17.

Figure 4:
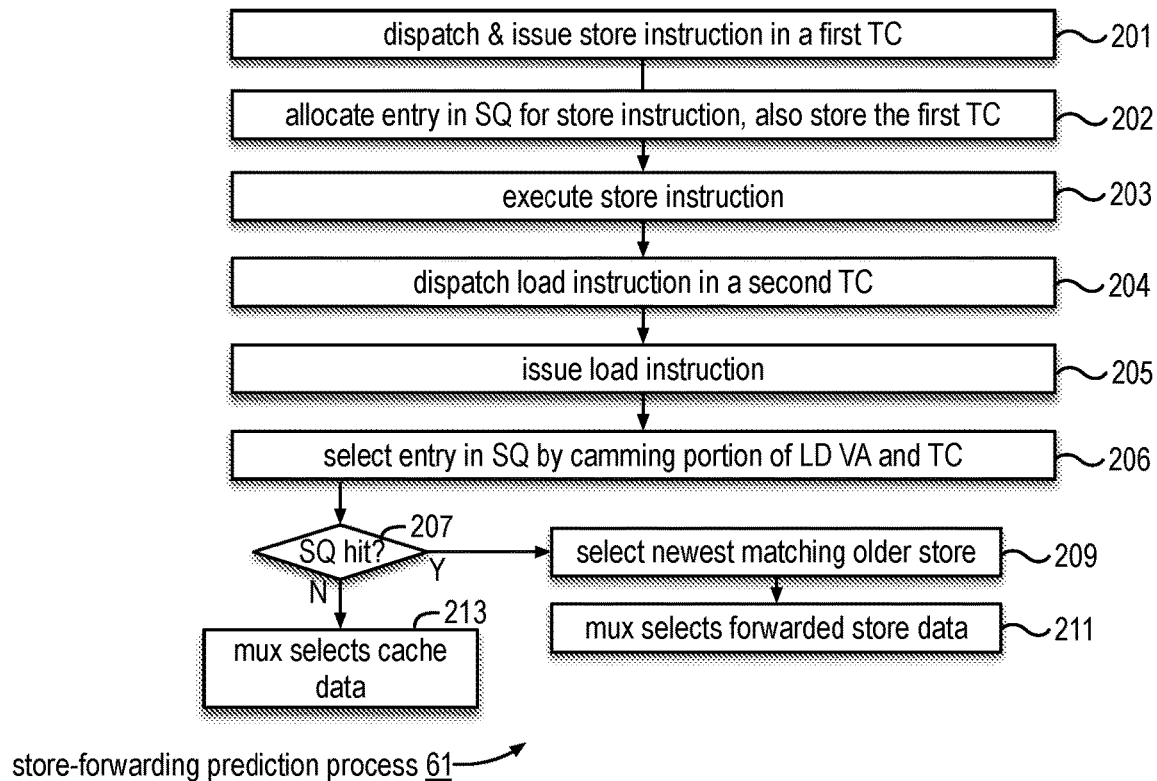
FIG. 4 is a flow chart of one embodiment of a process for accessing a SQ using a TC of a load instruction.

FIG. 4 illustrates an embodiment of a store forwarding prediction process 61 that utilizes the store forwarding prediction logic 1 of FIG. 2 in block 201. In block 201, the DEC 112 dispatches a load instruction 240 of a first TC to a scheduler 121. The load instruction 240 itself is associated with a TC 242 and PC 246. The load instruction 240 comprises a load opcode and one or more load operands used to calculate a "load VA" where the load data is stored or predicted to soon be stored. In block 202, an entry in the SQ 118 is allocated for the store instruction, and the TC of the store instruction is stored in a field of the allocated SQ entry 1181. In block 203, the store instruction executes and puts its results (i.e., the store data) in the allocated SQ entry 1181, while a parallel process calculates the store address.

In block 204, a load instruction, this time of a second TC, is dispatched. In block 205, the scheduler issues the load instruction 240. In block 206, cam logic 11 selects an entry 1182 by camming at least a portion or other derivative (e.g., hash) of the load VA 248 and TC 242 into the SQ 118. If there is an SQ match with a matching LD VA and TC (or hash or other derivative thereof) (block 207), then flow proceeds to block 209. Otherwise, flow proceeds to block 213. In block 209, the newest matching older store entry is selected from the SQ 118, and in block 411, a mux 13 having at least a store-to-load forwarding bus input and a cache hit data input selects and forwards the store data. If there is no SQ match, then in block 213, then the load instruction is retried, replayed, or stalled until the cache data becomes available, after which the mux 13 selects the cache data.

FIG. 5 illustrates one embodiment of an SDP 20 that comprises an MDP 111. Because no prediction of an available store is given unless the prediction's TC matches the load instruction's TC, the MDP 111 partially manifests a form of store-forwarding logic 2. The MDP 111 has an array or table of entries 1111 (as shown in FIG. 5) that are accessed using the load PC 246 and the TC 242. In various embodiments, the MDP 111 is accessed using the load TC 242 in combination with a load PC 246. The logic for accessing the MDP 111 may use camming, indexing, and/or by a combination of both (e.g., supplying both an index to pick a set of entries and a tag to cam against entries of the set). In one embodiment, the load PC 246 is used to index into a table with several ways and select a set of entries spanning the ways. Each entry of the selected set has a store forwarding prediction and a tag that includes or is derived from a TC of prior loads that had the same PC as the current load PC 246. The TC 242 or some derivative thereof is cammed against the tags to identify a matching entry, if any. If there is a matching entry, then the MDP 111 predicts—as indicated by the one-bit value of the forward signal 22—that uncommitted store data exists and can be successfully forwarded. If there is no matching entry, the MDP 11 predicts that no uncommitted store data is available, i.e., determines that no store-to-load forwarding attempt will be made. The MDP 111 shown here can be replaced with many different varieties of MDPs, including MDPs that provide additional information 24 besides a binary prediction. One example is an MDP that provides a confidence value.

Each entry 1851 of the SQ 118 includes a data field 15 to hold the store data, a physical address field 18 that stores at least some portion or derivative of the store physical address (if available), and optionally other metadata such as the age 16 of the SQ entry or a portion of the store VA 12. In one embodiment described in co-pending U.S. patent application Ser. No. 16/937,392, filed Jul. 23, 2020, and herein incorporated by reference, store forwarding logic conditions forwarding not only on matching TCs but also confirmation that the load PA matches the store PA and that the store data's permissions apply to the load instruction 240.

Update logic 50—including error-checking logic in the LSU itself and update-and-allocate logic within the MDP 111, is provided for the MDP 111. The LD PC 246 and LD TC 242 are used to update the MDP 111 with update information 26. The update information 26 includes the PC 246 of a load instruction to be updated, allocated, or invalidated, along with an index and/or tag that incorporates the TC 242. The update information 26 also includes a request to allocate an entry, invalidate an existing entry, or increment or decrement a confidence level of an existing entry.

Figure 6:
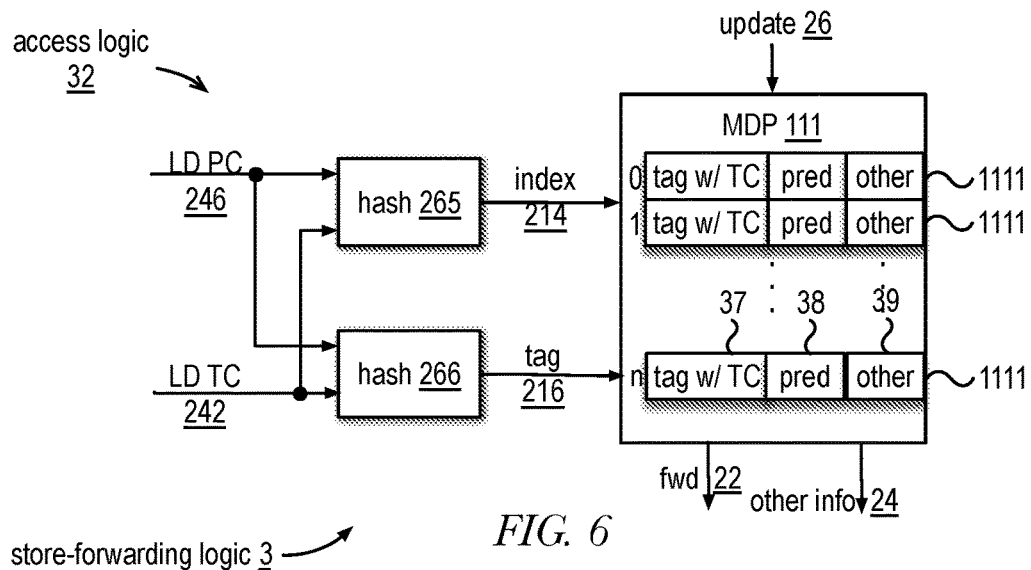
FIG. 6 illustrates an implementation of an MDP accessed using an index and a tag that are both formed from hashes of the program counter and TC of a load instruction.

FIG. 6 illustrates an embodiment of an MDP 111 and access logic 32 for the MDP 111. Because no prediction of an available store is given unless the prediction's TC matches the load instruction's TC, the access logic 32 partially manifests a form of store-forwarding logic 3. The MDP 111 comprises a plurality of MDP entries 1111 allocated to various load instructions that have or could have forwarded uncommitted store data. The entries are arranged in an indexed array, a table accessed using an index 214 and tag 216, or other data structure. In one implementation, the MDP entries 1111 are arranged as a TAGE-based predictor that stores predictions for load instructions differentiated by their PC, TC, and path history, along their store-to-load forwarding history. Each entry 1111 comprises a tag 37 that incorporates the TC, or a hash thereof, of a load instruction that populates the MDP 111. Each entry 1111 also comprises a prediction 38 and optionally other information 39 that makes the MDP 111 more effective.

The access logic 32 comprises an index 214, tag 216, hash logic 265 and 266, and at least a load PC 246 and load TC 242 feeding the hash logic 265 and 266. The index 214 selects a set of one or more entries 1111 from the MDP 111, and a tag 216 cams against each entry in the selected set to find an entry, if any, with a tag 33 that matches the tag 216.

The index 214 is a hash 265 of the load PC 246, load TC 242, and/or other information. The tag 216 is also a hash 266—combinatorically distinct from the hash 265—of the load PC 246, load TC 242, and/or other information. An example of other information incorporated into hash 265 and/or hash 266 is some form of path history, such as a return address. The index 214 and tag 216 may be generated using combinatorial logic 70 and/or hashing logic 82 outside or inside the MDP 111. In an alternative embodiment, only the index 214 or only the tag 216 incorporates a hash of the TC 242. In other embodiments, other forms of the TC 216—for example, a TC generation value 245—are used in placed of a hashed TC 244

Figure 7:
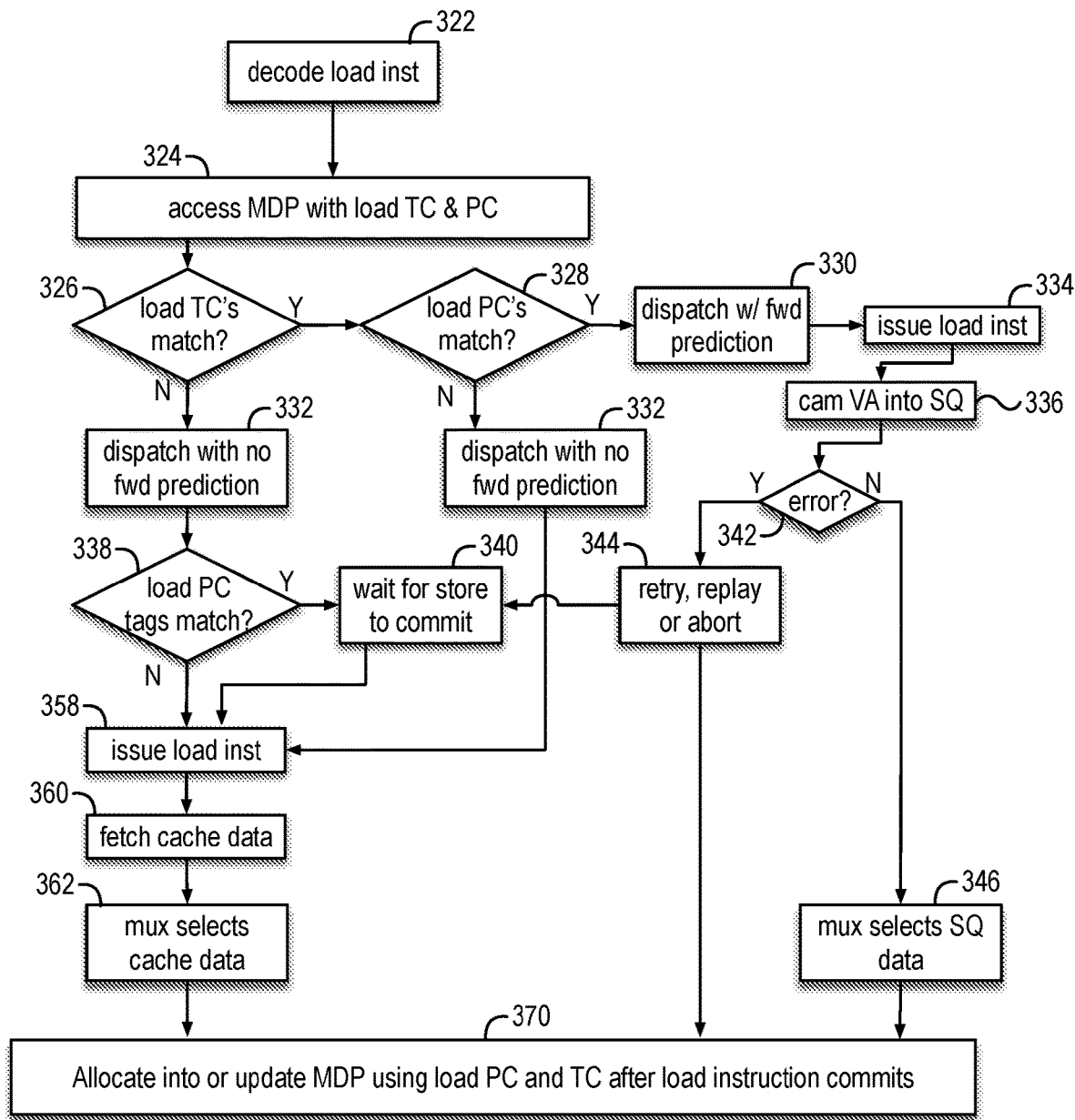
FIG. 7 is a flow chart that illustrates one embodiment of a process for a TC to regulate access to a forwarded store value.

FIG. 7 illustrates one embodiment of a store-forwarding prediction process 62 associated with the SDP 20 of FIG. 5.

In block 322, the decode logic 181 of the decode unit 112 decodes a load instruction. In block 324, the MDP 118 is accessed using the TC and PC of the load instruction. Conditional logic blocks 326, 328 and 338—which may be rearranged in any suitable combinatorial fashion—test whether the TC and PC of the load instruction match the TC and PC of any entry in the MDP 111. If the TC's and PC's of the load instruction and an MDP entry 1111 match (blocks 326 and 328 both resolve to true), this means that that the MDP 111 has a record of that load instruction with that TC successfully forwarding data from an uncommitted store and predicts that the load instruction can again successfully forward from an uncommitted store. The load instruction is dispatched with that prediction (block 330), issued (block 334), and has its VA cammed into the SQ 118 (block 336). If no error occurs (block 342), i.e., it is verified that an SQ entry 1181 exists with a store address that matches the load address, then the mux 280 (FIG. 1) selects the SQ data to forward to the load instruction (block 346). If there is an error, however, i.e., the camming finds no matching SQ entry 1181, then the load instruction is either retried, replayed, and/or aborted (block 344), or stalled with a no-forwarding prediction. On the second run of the load instruction through the execution units 114, the scheduler waits for older stores, if any, to commit (block 340) before issuing the load instruction (block 358) and fetching the cache data (block 360).

If there is no record of the load instruction with the same TC in the MDP 118 (block 326 or block 328 resolve to false) then in block 332, the load instruction is dispatched with no forwarding prediction. However, if the load PC's match an entry of the MDP 118 (block 338 resolves to true) but the load TC's do not match (block 326 resolves to false), then that means that an uncommitted store with a matching store address may exist. While the mitigation set forth in FIG. 7 prevents the load instruction from forwarding that data across a TC update boundary, the store instruction may be legal and, if so, it is important to prevent the load instruction from fetching data from the cache at that address before the store instruction has committed. Otherwise, the load instruction may be supplied with stale cache data. Therefore, the MDP 118 signals the scheduler 121 to delay issuance of the load instruction until the store has committed, or until all older stores have committed (block 340). Accordingly, in this embodiment, the MDP 111 outputs not only a no-forwarding signal but also a signal to delay issuance. Another embodiment of the store-forwarding prediction process 62 handle this situation without requiring an additional signal from the MDP 118—i.e., by populating the scheduler entry containing the load instruction with a memory dependence operator, forcing the load to wait until the store commits.

If the load PC does not match an MDP entry 1111 (block 328 or block 338), this indicates a prediction of no forwarding. If that prediction is correct, then there should be no need to wait for older stores to commit (block 340) before issuing the load instruction (block 358), fetching data at the load address from the cache (block 360), and having the mux 280 select the cache data (block 362).

Each of the paths described with respect to FIG. 7—except when no forwarding is correctly predicted—terminate with an allocation into or an update of the MDP 111 using the PC and TC after the load instruction commits (block 370). If the MDP 111 did not predict the availability of forwardable data even though there was some, then the MDP 111 is asked to allocate an entry 1111 in the MDP 111 to that load instruction with that TC. If the MDP 111 predicted the availability of forwardable data but none existed, then the MDP 111 is accessed to either deallocate (i.e., invalidate) the MDP entry 1111 associated with the load instruction at that TC, or to decrement a confidence level, if possible, associated with the entry. If the MDP 111 successfully predicted store-to-load forwarding, and it completed and committed successfully, the MDP 111 is accessed to increment or decrement a confidence level, if possible, associated with the entry.

Figure 8:
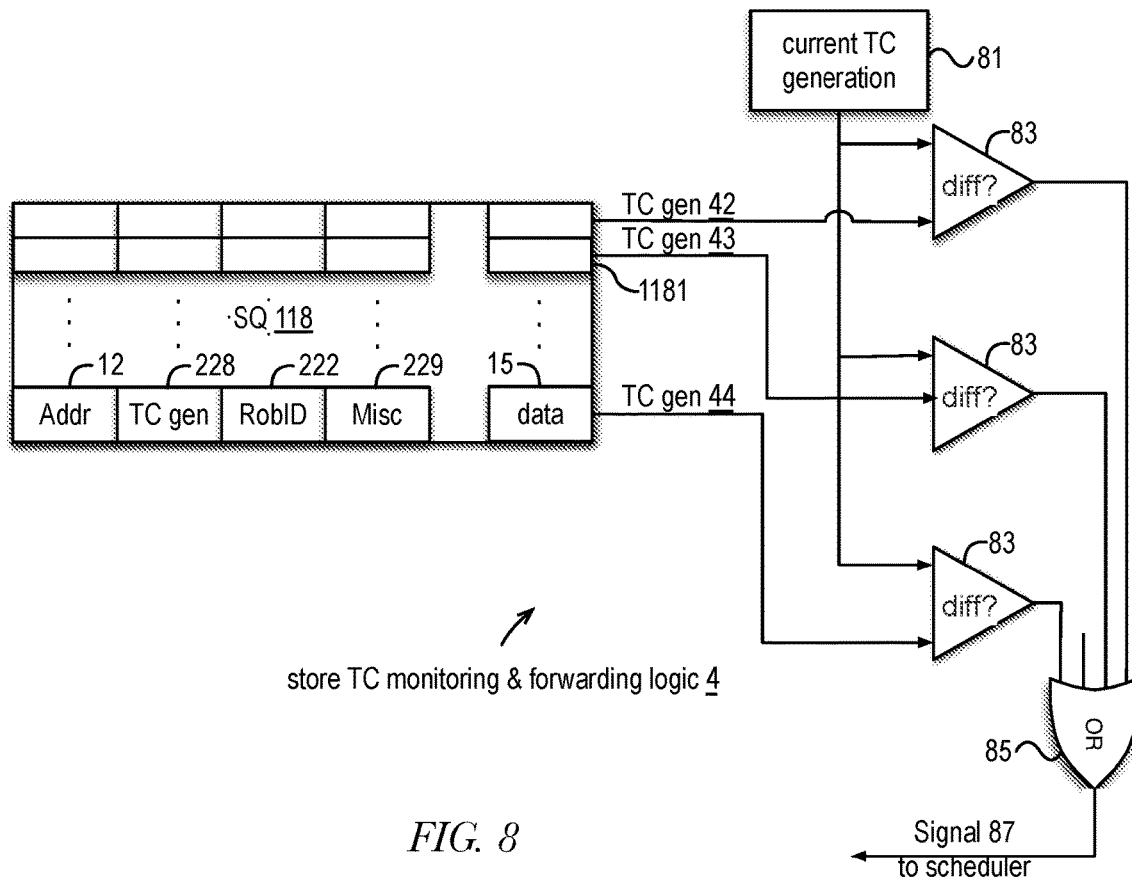
FIG. 8 is a block diagram of a reorder buffer (ROB) in which TC generation tags are added to the store entries so that they can be compared with a current TC generation state value to determine whether there are any uncommitted stores of an older TC still in the ROB.

FIG. 8 illustrates an embodiment of store TC monitoring and forwarding logic 4. This embodiment relies on a TC generation value, rather than the TC itself, to determine whether to allow store-to-load forwarding. In one implementation, a TC generation value indicative of an update to the TC is stored for each in-flight instruction. For example, a TC generation value may be stored for each in-flight instruction in the ROB 122. Alternatively, TC generation values are stored only for load and store instructions, assuming that these are the only instructions whose inputs and outputs might be affected by a TC update. In the example of FIG. 8, TC generation values 228 for store instructions are stored in the SQ 118. In yet another alternative, TC generation values 228 are stored as instruction tags that are propagated through the pipeline along with the instruction itself. It will be understood that the TC generation value could be held or stored in any suitable memory cell or structure, not just the ROB 122 or SQ 118 or as a tag.

The SQ 118 includes a plurality of entries for store instructions along with several metadata fields for each entry. These may include an address 118 for the instruction, a TC generation value 228 for the instruction, the RobID 222, the store data 15, a valid bit (not shown), and other unspecified information 229.

The TC generation value 228 is populated when a store or load instruction is dispatched. In the meantime, a register or other memory cell holds a current TC generation value 81 for instructions being dispatched from the processor 100. The current TC generation value 81 is continuously maintained and updated with every TC update. For each SQ entry 1118 containing a store instruction, a comparator 83 compares the TC generation value 42, 44, etc. in the TC gen value 228 for that entry with the current TC generation 81.

The comparator 83 outputs a logic one when the corresponding ROB entry is for an uncommitted store instruction and its TC generation value 42 is different from the TC generation 81. Otherwise, it outputs a logic-zero. Next, logic element 85 performs the equivalent of a plenary-input OR gate by combining the outputs of each comparison applicable to a store instruction. In this manner, logic element 85 determines whether there are any in-flight store instructions 260, 262, etc. belonging to an earlier (than current) TC generation. If any input into the OR gate 85, fed by any of the comparators, is a logic-one, then the gate 85 outputs a logic-one signal 87. When the scheduler receives a logic-one, then it prevents loads from issuing until the signal 87 flips to logic-zero. That is, the logic 85 issues a signal 87 to the scheduler preventing store-to-load forwarding and forcing the load instruction to wait for issuance until the cache data is available. If not, then the logic 85 issues a non-inhibitory logic-zero signal.

The store TC monitoring and forwarding logic 4 generates a signal 87 to allow a load to issue and forward from a store, if one with a matching store address has not yet committed, and if all of the store instructions in the SQ 118 have the same TC generation value as the current TC generation value 81. This result may be logically represented by each comparator 83 outputting a logic-zero value (i.e., the TC gens are not different) when all stores have the same TC value as the current TC generation, causing the OR gate 85 to produce a logic-zero signal 87 to enable a load instruction to issue from the scheduler and forward data from a matching store. The opposite result may be logically represented by one or more of the comparators 83 outputting a logic-one value (i.e., the TC gens are different), causing the OR gate 85 to produce a logic-one signal 87 to stall issuance of the load instruction. It will be understood that there are innumerable alternative circuits, constituting variations in polarities and/or design choice, that may be used to generate the same effect as logic 4.

The implementation in FIG. 8 completely prevents store-to-load forwarding until all older-TC-generation uncommitted stores complete, full-stop, without actually comparing the TC generation of the load instruction with any of the store instructions. Although this is not as specific as an embodiment—such as that depicted, next, in FIG. 10—in which store-to-load forwarding is prevented for only load-store pairs with different TC generations, it can advantageously be done before the load instruction issues, avoiding penalties associated with retrying, replaying, stalling, or aborting the load instruction. In general, FIG. 8's store TC monitoring and forwarding logic 4 advantageously makes a store-to-load forwarding decision before the load issues.

The TC generation value may consist of as little as a single bit of information that distinguishes the current TC from the last TC (in program order). In this case, the TC generation would simply alternate between 0 and 1 (i.e., even and odd) with each TC update. Because it would be more difficult for an SCA attack to exploit speculative stores that occurred two generations ago than those that occurred in an immediately preceding TC, this implementation provides some protection with a minimal number of transistors and at a minimal expense in power consumption.

Determining an optimal bit length for the TC generation value should take into account the following limitation: if using only a small set of TC generation values, care is recommended that no "new" generation value is assigned to an instruction if there are outstanding instructions tagged with or using the same value. This can be accomplished by stalling dispatch of instructions upon encountering this situation. Stated another way, no "new" generation value should be assigned to an instruction unless or until the new generation value has been freed up.

Running simulations can inform a design with an optimal bit length for the TC generation value. Without the benefit of such simulations, a reasonable guess is that the optimal bit length of a TC generation is between 2 and 4 bits, because it would be unusual for there to be more than four TC generations represented in the SQ 118 at any one time, and especially rare for there to be more than 16 TC generations represented in the SQ 118 at any one time. In one implementation, the TC generation value is incremented (or, if the TC generation value was maxed out (i.e., $2^n-1$ for an unsigned value), returned to zero) with each successive TC update. In another implementation, the TC generation value is decremented (or, if the TC generation value was 0 and unsigned, returned to $2^n-1$) with each successive TC update.

References to "incrementing" or "decrementing" the value are just as applicable to counters whose values are represented with reflected binary code (only one bit changed per increment or decrement), by deBruijn order, and other binary cyclic string specifications as it is to the standard, decimal-system-inspired binary numeral system. In an alternative implementation, when a TC generation update occurs, the TC generation value is selected from a pool of available, freed-up TC generation values, wherein the selection is made in a non-repeating, non-cyclical order, for example, a random order or an order in which the smallest freed-up value is selected.

It will be understood that the concept of using TC generations to mitigate against store-forwarding attacks is not limited to the very specific circuitry discussed above and/or shown in FIG. 8. As any student learns in the first year or two of an electrical engineering program, there are a vast array of Boolean gate configurations that can achieve the same function depicted herein.

Figure 9:
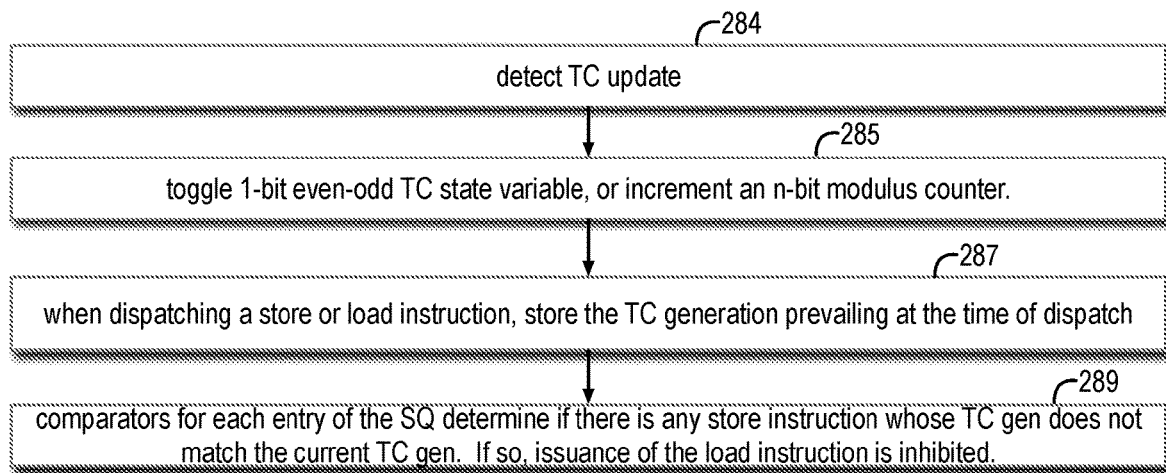
FIG. 9 is a flow chart that illustrates an embodiment of preventing store-to-load forwarding if there are any uncommitted older-TC stores still in the ROB.

FIG. 9 is a flow chart that illustrates a full-stop process 283 for preventing store-to-load forwarding if there are any uncommitted stores of an older TC still in the ROB, using, for example, the store TC monitoring and forwarding logic 4 of FIG. 8. In block 284, the processor 100 detects a TC update. In block 285, the detection of the update toggles a 1-bit even-odd state variable or advances an n-bit modulus counter. In block 287, a store or load instruction is dispatched, and the current TC generation value—i.e., TC generation value prevailing at the time of dispatch—is stored as the TC generation of the instruction. While the current TC generation value changes over time, only one TC generation applies to the instruction.

In block 289, comparators 83 and other logic 85 determine whether there are any uncommitted store instructions whose TC does not match the current TC. If so, store-to-load forwarding is prevented. Otherwise, store-to-load forwarding is allowed (i.e., not prevented). Of course, there could be other conditions—e.g., addresses that don't match or permissions violations—that could prevent or cancel store-to-load forwarding.

In an alternative embodiment to FIGS. 8 and 9, TC generations or generation tags are associated with both load and store instructions as they advance through the pipeline. When the TC is updated from a former TC to a current TC, a TC generation value is designated for the current TC. The current TC generation value is assigned to load and store instructions (at least, and potentially to all instructions) between decode and execution of the load and store instructions. For a given load instruction, a subset of one or more store instructions from which to forward data is identified. The load's TC generation value is compared with the TC generation values of store instructions in the subset. For the stores of the subset that do not have the same TC generation value as the given load's TC generation value, forwarding of the store data to the load instruction is prevented.

Another method for preventing store-to-load forwarding between TCs is to only dispatch one generation of ops at a time in the back end. This is conceptually equivalent to a 0-bit implementation of FIG. 9. An n-bit implementation allows $2^n$ TC generations in the back end at a time. A 1-bit implementation allows two TC generations in the back end at a time. A 0-bit implementation (or at least its conceptual equivalent) allows only one TC generation in the back end at a time.

Figure 13:
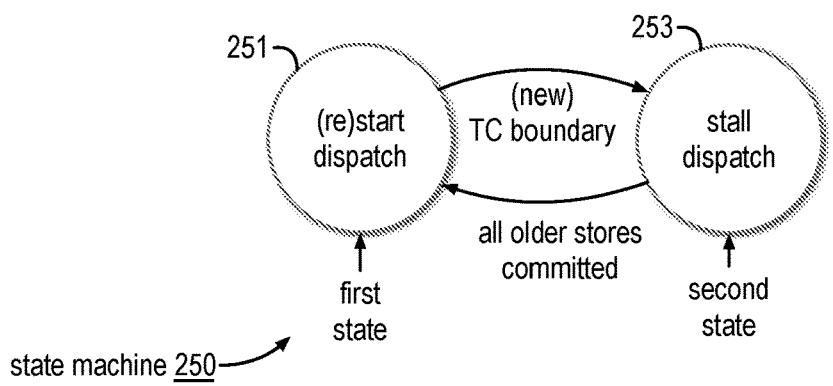
FIG. 13 illustrates a state machine that, in one embodiment, controls whether store-to-load forwarding is prevented or not by reason of a TC update.

FIG. 13 illustrates a state machine related to FIGS. 8 and 9 that, on the basis of the TC, controls whether store-to-load forwarding is prevented. The first state 251 is one in which store-to-load forwarding is available, provided that all other conditions of store-to-load forwarding are met. The second state 253 is one in which instructions are store-to-load forwarding is disabled, for example, by preventing newer-generation load instructions from executing, or by allowing execution but aborting, replaying, stalling, or retrying load instructions before they can commit. In a first implementation, the state machine 250 advances from the first state 251 to the second state 253 whenever there is a TC change. In a second implementation, the state machine 250 advances from the first state 251 to the second state 253 whenever there is a TC update, even if the TC does not change. The state machine stays in the second state 253 until all older stores have committed.

Figure 10:
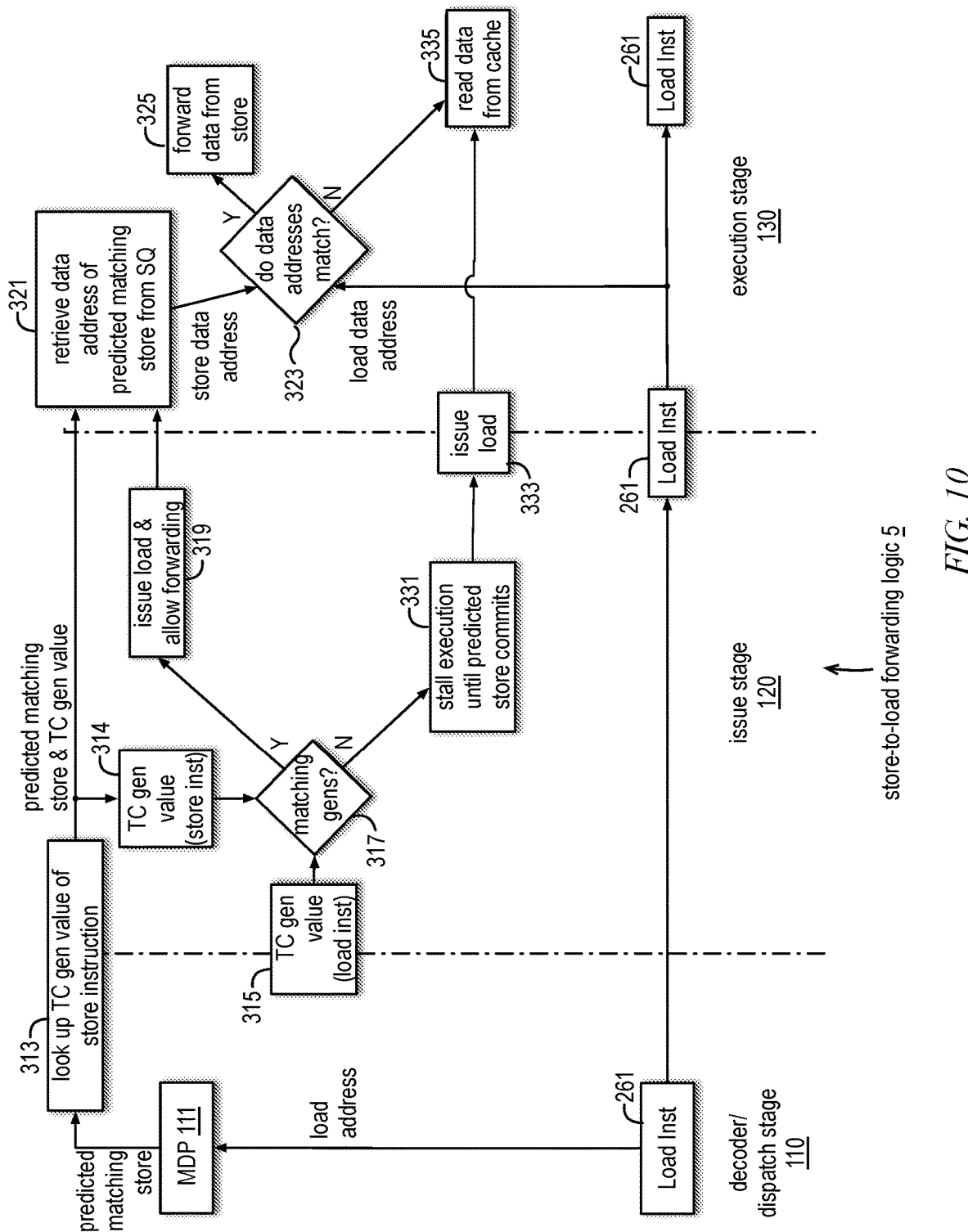
FIG. 10 is a block diagram of one embodiment of a process for conditioning store-to-load forwarding on a comparison of TC generation values of a load instruction and a matching store instruction.

FIG. 10 is a mixed block/flow chart illustration of store-to-load forwarding logic 5 that directly compares the TC generations 42 and 43 (FIG. 11) of the load and store using the TC generation tags for the store and load. This has the advantage, unlike FIG. 8, of not disallowing forwards between stores and loads of the same generation after a TC update, potentially improving performance. In one implementation, the TC generation values are retrieved from the ROB 122. Alternatively, the TC generation values are retrieved from load and store queues or an instruction stream augmented with TCs or TC generation values.

Absent some prediction of the matching store, this embodiment may create a disadvantage in that the TC or TC generation comparison is not made until what is predicted to be the matching store is identified, which in conventional processors occurs after the load instruction is issued. Such logic when used in conjunction with many conventional processors does not necessarily prevent the forward, but instead requires that the load instruction be retried, replayed, stalled, or aborted mid-execution, with a potential performance penalty.

In FIG. 10, however, this penalty is eliminated with an MDP 111 that predicts not only whether store data from an uncommitted store will be available to forward, but also which SQ entry will provide the store data. This allows the logic 85 to compare the TC generations 42, 43 before the load issues. Store-to-load forwarding is prevented when the TC generations do not or are predicted to not match.

Expounding further, FIG. 10 illustrates one embodiment of a store-to-load forwarding process 6 that occurs as a load instruction 261 progress through three stages of a pipelined instruction execution process—the dispatch stage 110, the issue stage 120, and the execution stage 130. As illustrated by block 111, at or about the time when the instruction is in the decode unit 112 and ready for dispatch, the load instruction is looked up in the MDP 111 to retrieve an indicator of a predicted matching store, if any. In block 313, this indicator is used to look up the TC generation value 314 of the store instruction predicted to match. The TC generation value 314 may be acquired from the ROB 122, the SQ 118, from the store instruction itself, or from some other structure, depending on the implementation.

As or about when the load instruction 261 is dispatched, it is assigned a TC generation value 315. In condition block 317, the TC generation values 314 and 315 of the load and store instructions are compared. If they match, then in block 319 the instruction is issued and allowed to forward (provided that other conditions—ascertained before or after—are met). The consequences of TC generation values 314 and 315 not matching are discussed further below.

Flow proceeds from block 319 to block 321, wherein the data address of (or at least some portion thereof) the predicted matching store is retrieved from the SQ 118. The data address (or at least some like portion thereof) of the load instruction 261 is also brought forth. In condition block 323, a comparison is made of the store data address and the load data address, or at least as much of the two addresses as were retrieved. If the data addresses (or retrieved portions thereof) match, then in block 325, data is forwarded from the store instruction to the load instruction 261. If the data addresses (or retrieved portions thereof) do not match, then in block 335, the load instruction 261 reads the store data from the cache after the store instruction commits.

Returning to condition block 317, if the generations of the load and the predicted store do not match, then execution of the load instruction 261 is stalled until the predicted store commits. Next, in block 333, the load instruction 333 issues. Finally, in block 335, the load instruction 335 reads data from the cache.

Figure 11:
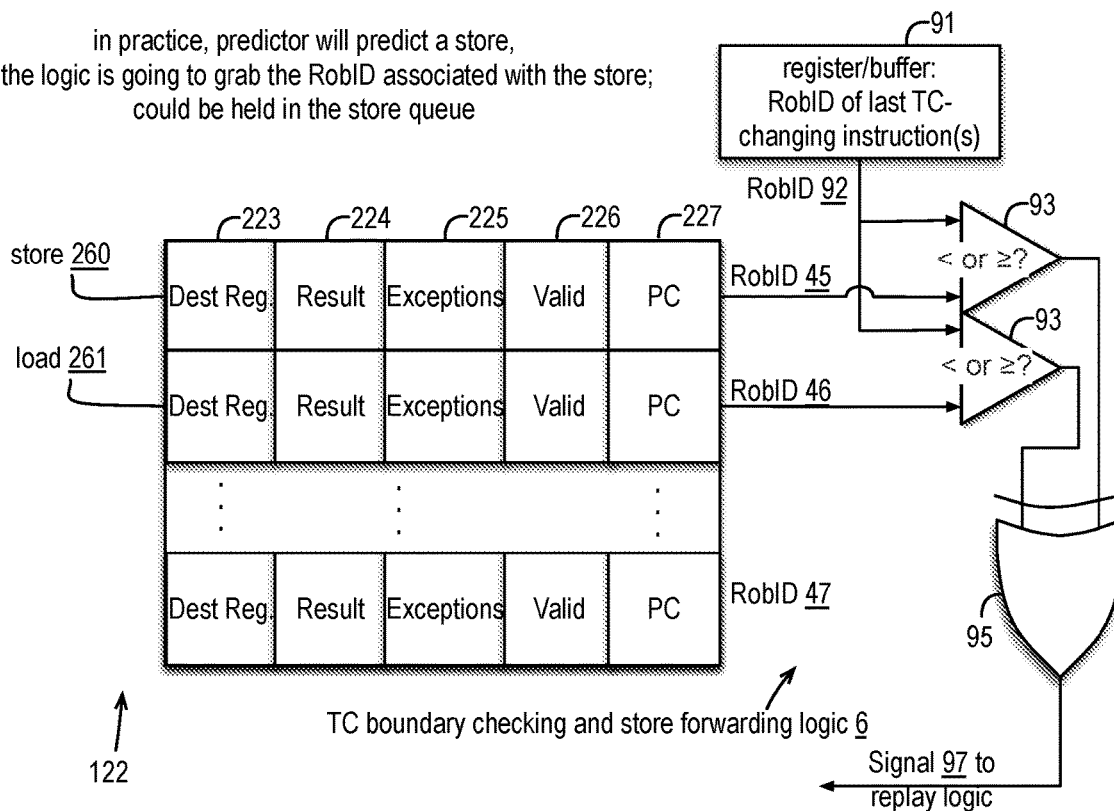
FIG. 11 is a block diagram of another embodiment in which RobIDs of stores and loads are compared with a RobID of the last TC-changing instruction to control whether store-to-load forwarding is prevented or not by reason of a TC update

FIG. 11 illustrates another arrangement for conditioning store-to-load forwarding on the TC. Instead of explicitly designating and tracking TC generations, TC boundary checking and store forwarding logic 6 tracks one or more TC boundaries, which mark one or more transitions between TC generations. The TCs of a load and a potentially matching store instruction are then compared with the TC boundaries to determine whether to forward.

A TC boundary separates one set of instructions associated with a newer TC from an immediately preceding set of instructions associated with an immediately preceding TC. There are two types of TC boundaries, either of which may be implemented as a design choice: (1) a TC change boundary the marks an actual change to the TC; and (2) a TC update boundary that marks an update to the TC which does not necessarily change the TC.

The boundary checking logic 6 tracks TC boundaries by tracking program order ordinals of instructions representing TC boundaries. In particular, the RobIDs of TC boundaries are tracked. Within a conventional ROB, program ordinal ordinals are implicitly associated with each in-flight instruction.

FIG. 11 illustrates a ROB 122 with entries that are implicitly associated with RobIDs 45, 46, 47, etc. The TC boundary checking logic 6 stores the RobID 92 of at least the last TC-changing or -updating instruction in a special register, buffer or other memory location 91. This is continually maintained and updated.

After a load instruction issues, one or more candidate prior uncommitted store instructions are identified to potentially forward store data to the load. In a first implementation, this identification is made by camming the load address, or a portion thereof, against the SQ 118. The SQ 118 identifies a store instruction, if any, that has the same store address as the load address. If more than one store instruction has the same store address as the load instruction, the most recent store instruction older than the load instruction is selected. In a second implementation, a candidate prior uncommitted store instruction is identified by accessing an MDP 111. In a third implementation, an entire set of candidate prior uncommitted store instructions—e.g., all of the older stores in the SQ 118—are selected and tested to determine whether forwarding any of their store data to the load instruction would cross a TC boundary. Such an implementation, by comparing TCs before any addresses are compared, could reduce the number of address comparisons needed to find a matching store. For simplicity, the following description assumes that there is only one candidate uncommitted store instruction for the logic 95 to handle, leaving it to ordinarily skilled artisans to apply prior art techniques to extrapolate the logic 95 to sort through multiple candidate uncommitted store instructions.

To test whether forwarding would cross a TC boundary, the TC boundary checking logic 90 looks up the RobID 46 of the load instruction 261 as well as the RobID 45 of the matching store 260. In one implementation, comparators 93 compare these RobIDs 45 and 46 with the RobID 92 of the last TC-changing instruction. If the RobIDs 45 and 46 straddle (i.e., one is greater than and one is less than) any TC boundary, then signal 97 causes the load to retry, replay, stall or abort. If the RobIDs 45 and 46 are on the same side of (i.e., both are greater than or equal to or both are less than) the TC boundary represented by RobID 92, this suggests that the load and store instructions share the same TC. The logic 95 performs the equivalent of an XOR gate by producing a signal 97 that does not prevent the load from completing and committing.

Comparison with only a single TC boundary could result in an inordinate risk of improper store-to-load forwarding. There could be several TC boundaries in any given snapshot of the inflight, yet still uncommitted, instructions in the ROB. Even if the ordinals of the most recent load and store instructions are on the same side of the most recent TC boundary, they could still straddle an older TC boundary.

To minimize or eliminate the risk of forwarding across a TC boundary an enhanced implementation of FIG. 11 stores a plurality of the most recent TC boundary program order ordinals in a TC boundary ordinal buffer and compares the RobIDs 45 and 46 with each of these buffered ordinals. In one implementation, the logic 6 is adapted so that forwarding is allowed if the ordinals of both a load instruction and its candidate forwarding store instruction are on the same "side" (i.e., either both are greater than or both are lesser than) of each and every TC-changing instruction ordinal). Except for two "end" cases—discussed below—this is equivalent to determining that both the store and load instructions are "sandwiched" between two consecutive TC-changing RobIDs.

To illustrate the ease with which logic could be created to accommodate the enhanced implementation discussed above, consider FIG. 11 as having an n-entry buffer 91, where n>1. A single entry of buffer 91 together with comparators 93 et al., and XOR gate 95 would constitute a "slice" of circuitry that compares the RobIDs of each load and its candidate forwarding store to a single one of the TC-changing RobIDs stored in the buffer 91. A logic-one output would indicate that the RobIDs of the load and store instructions straddle a TC boundary. A logic-zero output would indicate that the RobIDs are on the same side of the TC-changing RobID of that slice.

By duplicating that slice for each and every entry of the buffer 91, an array of XOR gate 95 outputs would be generated, each one indicating whether the contemplated load-and-store pair is on the same side of its corresponding TC-changing ordinal. Each of the XOR 95 outputs would then be ORed together to generate signal 97. It should be noted that the OR gate is not illustrated in FIG. 11 but would be located between the XOR gates 95 of all of the slices and an ultimate signal 97. In the implementation shown, signal 97 drives an active-low signal to subsequent logic that inhibits store-to-load forwarding.

If the output of any of the slices' XOR gates 95 is true, this indicates that the instructions straddle a TC boundary. The signal 97 that is the output of the OR gate (not shown) that joins all of the slices' XOR gate outputs would be logic-one. Because the subsequent logic is enabled by an active-low (i.e., logic zero) signal, the store-to-load forwarding would not be enabled. Accordingly, no forwarding is allowed. If the load instruction has already issued, it will need to be retried or replayed.

On the other hand, if all of the XOR gate 95 outputs are false, meaning that the RobIDs of the load and its candidate forwarding store do not straddle a TC boundary, the signal 97 output by the OR (not shown) of the XOR gates 95 is driven low. Because the subsequent logic is enabled by an active-low (i.e., logic zero) signal, the store-to-load forwarding would be enabled.

When an n-entry buffer of the last n TC generations is used to store n program order ordinals of the most recent TC boundaries, each detection of the update may result in an existing entry being freed, if one is not already available, so that the RobID of the newest TC-changing instruction can be allocated in the n-entry buffer. Alternatively, new ordinals are inhibited from being stored unless an entry in the buffer is free—for example, because an instruction associated with the oldest buffered TC boundary has committed or retired. As discussed further below, one or two "end" cases are possible if the buffer 91 is not big enough to account for every possible TC update instruction that could be inflight and uncommitted.

In another implementation of this embodiment, the logic 6 determines whether the RobIDs 45 and 46 are sandwiched between two consecutive TC boundaries using directional comparison logic (i.e., the comparisons yield three possible outputs—(a) both less than; (b) the two straddle, and (c) both greater than—the TC boundary. Further circuitry determines whether, for any two consecutive TC boundaries, the load and store instructions are greater than the smaller of the two TC boundary ordinals and less than the greater of the two TC boundary ordinals. If so, then the program order ordinals of the load instruction and the candidate prior uncommitted store instruction are both in between a common pair of consecutive ordinals of the set of one or more most recent TC update-causing instructions. In this case, or in an end case where the logic assumes that the store and load instruction share or probably share the same TC, store-to-load forwarding is permitted (and performed provided that any other store-to-load forwarding prerequisites or conditions—such as successful permissions checks—are met). On the other hand, when the program order ordinals of the load instruction and the candidate prior uncommitted store instruction are between different pairs of consecutive ordinals of the set of one or more most recent TC update-causing instructions, store-to-load forwarding from the candidate prior uncommitted store instruction to the load instruction is prevented.

As stated above, the logic 95 may also make determinations for one or two edge or end cases. In the first end case, the program order ordinals or RobIDs 45 and 46 of the load instruction and the candidate prior uncommitted store instruction are both on the near side of the most recent TC update-causing instruction for which an ordinal or RobID is recorded (i.e., both younger than the youngest buffered TC boundary). In the second end case, the program order ordinals or RobIDs 45 and 46 of the load instruction and the candidate prior uncommitted store instruction are both on the far side of the oldest TC update-causing instruction for which an ordinal is recorded (i.e., both older than the oldest buffered TC boundary). In some implementation choices, one or both of these end cases are assumed to belong to the same TC generation, so that forwarding is allowed. In another implementation choice, no forwarding is allowed in either end case because there is a risk that the load and store instructions are in different TCs.

How the edge cases are dealt with are matters of design choice. According to a first design choice, ordinals are stored in a FIFO buffer that is as long as the ROB. If the load instruction and the candidate store instruction are both either more recent than the newest tracked ordinal or older than the oldest tracked ordinal, then they have the same TC, and forwarding is permitted. According to a second design choice, the FIFO buffer is shorter, but the newest tracked ordinal always represents the most recent TC update. When the load and candidate store instructions are both more recent the newest tracked ordinal, then they have the same TC, and forwarding is permitted. But when the load and candidate store instructions are both older than the oldest tracked ordinal, it may not be certain whether they have the same TC. According to a third design choice, this edge case might be handled by preventing forwarding. Alternatively, in a fourth design choice, the probability of the TC's being different may be so low that forwarding is permitted.

In another implementation, the logic 95 compares the load instruction ordinal and the candidate store instruction ordinal with each buffered TC boundary ordinal. If, for each TC boundary ordinal, the load and candidate store instructions are both greater than, or both less than, that TC boundary ordinal, then the load and candidate store instructions are necessarily either sandwiched in between two consecutive TC boundary ordinals, or both positioned on the same side of an end-buffered TC boundary ordinal.

In summary, FIG. 11 illustrates an efficient method for determining when a load instruction and candidate prior uncommitted store instruction—by storing program order ordinals of TC-updating instructions and comparing the store and load instructions with each buffered program order ordinal. If, for each of the buffered program order ordinals, the load and store instructions are on the same side of the ordinal, then—except perhaps for the two edge cases—the TCs of the load and store instructions must be the same. This eliminates any need to identify a common pair of consecutive TC boundary ordinals between which the load and store instructions are ordered. This more efficient method indirectly proves that the load and store instructions are ordered between some two consecutive TC boundary ordinals in the TC boundary ordinal buffer.

Figure 12:
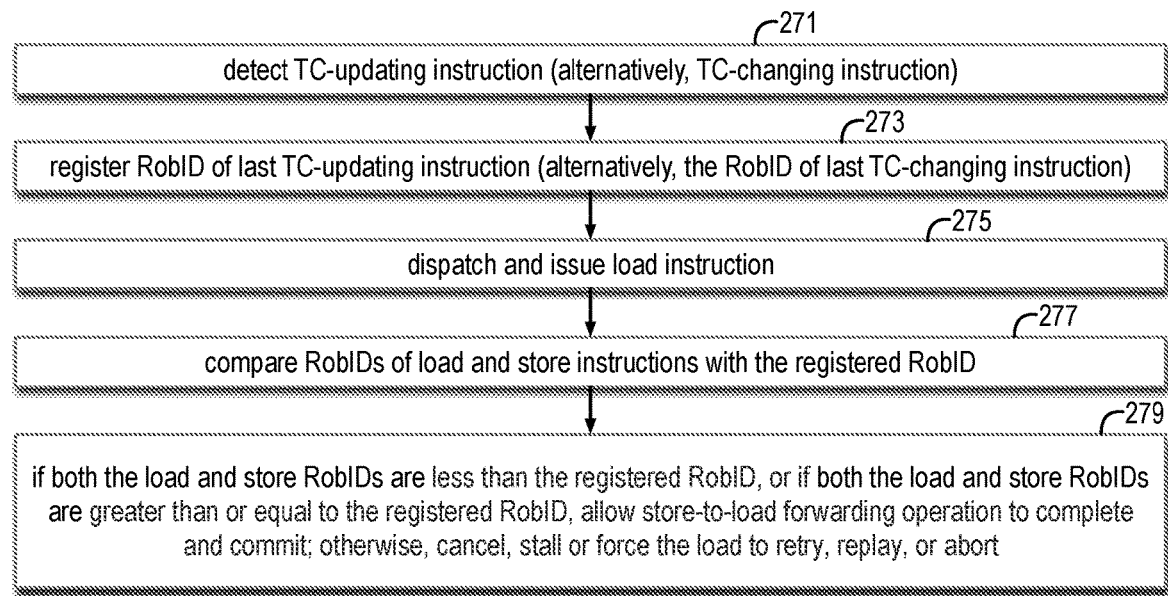
FIG. 12 is a flow chart of a RobID-based embodiment for controlling whether store-to-load forwarding is prevented or not by reason of the TC.

FIG. 12 is a flow chart 270 of a RobID-based embodiment for controlling whether to reject store-to-load forwarding on the basis of non-matching TCs. In block 271, the DEC 112 detects a TC updating instruction. There is a class of instructions that attempt to set, or that potentially trigger an update in, some component of the TC (e.g., the PM). The TCU logic 180 (FIG. 1) detects these instructions and responsively alerts the PCL 132.

What the PCL 132 does with the alert is implementation dependent. In one implementation, restrictions on store-to-load forwarding are imposed without detecting whether the TC update actually changed the TC. In another implementation, comparison logic in the PCL 132 (or alternatively located in the DEC 112 or elsewhere) determines whether the TC has changed, by comparing the updated TC with the prior TC. The PCL 132 may also be responsible for designating TC generation values or stalling the dispatcher 182 until all stores with an older TC have committed or retired.

In the implementation exhibited by FIG. 12, the PCL 132 may not only detect the TC update (block 284) but also share the determination of a TC update with the ROB 122. In block 285, this information facilitates the registration of the RobID of the last TC-updating instruction. The PCL 132 may also be responsible for updating the TC for the execution units as a TC-updating instruction is dispatched. When the TC-updating instruction is dispatched, the ROB 122 allocates an entry for the instruction. The ROB 122 also records the RobID of the TC-updating instruction in a special register 91 or buffer.

It will be understood that many of the PCL's functions could be performed by circuitry outside of the PCL 132, the functions are related to other functions performed by the PCL 132, making the PCL 132 a logical place to perform them.

Sometime later, in block 275, the DEC 112 dispatches and the scheduler 121 issues a load instruction. The SQ 118 is accessed to find any matching store, and if so, the most recent matching store. Once this is determined, the TC boundary checking logic 90, in block 277, compares the RobIDs of the load and store instructions 261 and 260 with the RobID 92 of the last TC-changing instruction.

In block 279, if both the load and store RobIDs 45 and 46 are less than the RobID 92 of the TC-changing instruction, or if both the load and store RobIDs are greater than or equal to the RobID of the TC-changing instruction, then the TC boundary checking logic 90 allows the store-to-load forwarding operation to complete and commit. Otherwise, the TC boundary checking logic 90 cancels the forwarding and/or forces the load to retry, replay, stall, or abort. As an alternative to block 279, comparators 83 and other logic 85 determine whether a store instruction that is a candidate for forwarding store data to a load instruction are either in between the same two consecutive TC-updating or -changing boundaries, on the near side of the most recent TC-updating or -changing instruction, and/or on the far side of the oldest recorded TC-updating or -changing instruction.

The embodiment of FIGS. 11-12 has an advantage over the full-stop embodiment of FIGS. 8-9 in that store-to-load forwarding is permitted for load-store pairs on either side of the TC boundary. But the embodiment of FIGS. 8-9 has an advantage over the embodiment of FIGS. 11-12 in that it prevents store-to-load forwarding before the load is issued, rather than after the load is issued. Cancelling a forward may generate a greater performance penalty than preventing the forwarding from occurring in the first place. Which embodiment is superior depends on the processor implementation and implementation costs and may be discoverable through simulation testing.

The various circuits discussed above are examples of logic that can carry out various intended functions. Many modifications and substitutions could be made that are consistent with those functions. For example, detection of TC updates could occur outside of the decode unit 112, for example, in the fetch unit 106 or in the back end, before the dispatched stream of instructions get This is suitable for exception causing instructions that get aborted along with newer instructions. ed out of order to improve performance. Circuitry to detect whether actual TC changes occur, as well as circuitry to track TC generations, current TCs, and/or to enforce TC-based restrictions on store-to-load forwarding could occur outside of the PCL 132.

Although a single core 100 is shown, the processors and SCA mitigation techniques described herein are not limited to a particular number of cores. Generally, the SCA mitigation embodiments may be employed in a processor conforming to various instruction set architectures (ISA), including but not limited to, x86, ARM, PowerPC, SPARC, and MIPS. Nevertheless, some aspects of embodiments are described with respect to the microprocessor 100 conforming to the RISC-V ISA, as described in specifications set forth in Volumes I and II of "The RISC-V Instruction Set Manual," Document Version 20191213, promulgated by the RISC-V Foundation. These two volumes are herein incorporated by reference for all purposes. However, the embodiments of the SCA mitigation techniques are not generally limited to RISC-V.

The foregoing embodiments mitigate STL-SCAs in which an SCA load instruction in one TC attempts to forward data from victim store instruction that executed in a different TC. Therefore, embodiments disclosed herein are effective in preventing, or at least mitigating, STL-SCA attacks using one virtual machine to access protected data in another virtual machine, a virtual machine to access data that should be exclusive to a hypervisor, a user process to access data that should be exclusive to the operating system, or a user process from accessing private data of another user process. More generally, an SCA that invokes or constructs a load instruction executed in one TC to access an entry associated with a different TC will fail to forward uncommitted store data to the load instruction.

In embodiments disclosed herein, TCs (or TC derivatives) are mapped to, included in, or otherwise associated with virtually addressed queue or buffer entries. The methods and logic disclosed herein may also be applied to other shared microarchitectural resources.

Embodiments disclosed herein are applicable to speculatively executing processors and processor cores. Speculative execution means that an instruction can be executed during a time when at least one instruction older in program order than the instruction has not completed execution, and a possibility exists that execution of the older instruction will result in an abort, i.e., flush, of the instruction. Speculation may exist in many forms, including forwarding on the basis of a partial address match or forwarding before ensuring that all of the permissions are met. Speculation may also exist when forwarding on the basis of a complete address match and complete permissions check because one or more of the addresses being compared may have been calculated from operands that were determined by older, but still uncommitted, instructions.

This application presents different ways of preventing store-to-load forwarding. One way is to block load instructions from being issued and executed. Yet another way is to temporarily and selectively block load instructions from being dispatched. A further way is to block (stall) all instructions from being dispatched after detecting a TC update until all older instructions have committed. The effect of each of these blocking actions can also be minimized by blocking load instructions only if they have a different TC than the store instructions from which they are otherwise going to load.

Other methods effectively prevent load-to-store forwarding. For example, a load instruction may get execute far enough that it briefly forwards data from the store; but very quickly thereafter, the load instruction is cancelled and forced to retry, replay, and/or abort. "Very quickly" means before the load instruction commits, and quickly enough to prevent use by a side channel attack of the forwarding data, or—to put it another way—quickly enough that the data result of the load cannot be speculatively used directly or indirectly by another dependent load or store instruction. As used in the claims, the limitation "preventing store-to-load forwarding" encompasses effectively preventing store-to-load forwarding, as described in this paragraph.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Claim terms used in herein take on their ordinary meaning, if any, as qualified by the context. The ordinary meaning may include a colloquial use of a term, if any, provided that the specification context suggests such use. The ordinary meaning may also take on a meaning that extends use of the word to an analogous field, when it is apparent in the specification that the term is being used in such a way. Claim terms can take on a specialized meaning when it is clear from the specification, as exemplified by the term "store dependence predictor," which as used herein applies to store queues as well as memory dependence predictors. Claim terms that may not have an ordinary meaning, such as "translation context," take on the meaning as defined in the specification or as exemplified by examples in the specification.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

I claim:

1. A method for mitigating side channel attacks that exploit speculative store-to-load forwarding in a processor, comprising:
   using an identifier and translation context (TC) of a load instruction to access a store dependence predictor that provides a prediction of whether the load instruction has a memory dependency on a store instruction that specifies store data that is or will be available to forward to the load instruction, wherein said using a TC of the load instruction to access a store dependence predictor comprises comparing a TC indicated by an index, tag or entry of the store dependence predictor with the TC of the load instruction;
   generating, by the store dependence predictor, a signal that reflects said prediction of whether the load instruction has a memory dependency on a store instruction that specifies store data that is or will be available to forward to the load instruction; and
   wherein a TC comprises an address space identifier (ASID), a virtual machine identifier (VMID), a privilege mode (PM) or a translation regime (TR), a combination of two or more of the ASID, VMID, and TR or PM, or a hash and/or subset of the ASID, VMID, and/or TR or PM; and
   wherein speculative store-to-load forwarding-exploitive side channel attacks in which the load instruction in an attacker TC attempts to forward the store data from a victim store instruction that executes in a victim TC that is different from the attacker TC are mitigated.

2. The method of claim 1, wherein the store dependence predictor is predictive, at least in part, because the prediction is made before making a full data address comparison of the load instruction with one or more outstanding store instructions.

3. The method of claim 1, wherein the store dependence predictor is predictive, at least in part, because the prediction is made before verifying that the load instruction has permission to access the store data.

4. The method of claim 1, further comprising using the TC to determine which entry of the store dependence predictor to store, increment or decrement a confidence value associated with the load instruction.

5. The method of claim 1, wherein said signal selects between forwarding of the store data to the load instruction and not forwarding of the store data to the load instruction.

6. The method of claim 1, wherein said signal selects between accessing and not accessing a store queue to forward the store data.

7. The method of claim 1, wherein the store dependence predictor comprises a store queue and the generated signal comprises a signal that selects between forwarding of the store data to the load instruction and replaying, retrying or stalling the load instruction to load the store data from a cache.

8. The method of claim 1, wherein the store dependence predictor is accessed with an index and/or tag, and said using a TC of the load instruction to access a store dependence predictor comprises generating the index and/or tag by hashing or concatenating the TC with other information.

9. The method of claim 1,
   wherein said comparing a TC comprises:
      comparing a hash and/or concatenation of the TC with other information.

10. The method of claim 1,
    wherein the store dependence predictor comprises a memory array; and wherein said using a TC of the load instruction to access a store dependence predictor comprises hashing or concatenating the TC of the load instruction with an instruction address of the load instruction to generate an index into the store dependence predictor memory array.

11. The method of claim 1,
wherein the store dependence predictor comprises a content-addressable memory that holds TCs and data addresses of each of a plurality of store instructions; and
wherein said using an identifier and TC of a load instruction to access a store dependence predictor comprises determining whether the TC of the load instruction matches the TC of any of the plurality of store instructions.

12. A processor that mitigates side channel attacks that exploit speculative store-to-load forwarding in a processor, the processor comprising:
a store dependence predictor that provides a prediction of whether a load instruction has a memory dependency on a store instruction that specifies store data that is or will be available to forward to the load instruction, wherein the store dependence predictor:
is accessible using an identifier and TC of the load instruction by comparing a TC indicated by an index, tag or entry of the store dependence predictor with the TC of the load instruction; and
generates a signal that reflects said prediction of whether the load instruction has a memory dependency on a store instruction that specifies store data that is or will be available to forward to the load instruction;
wherein a TC comprises an address space identifier (ASID), a virtual machine identifier (VMID), a privilege mode (PM) or a translation regime (TR), a combination of two or more of the ASID, VMID, and TR or PM, or a hash and/or subset of the ASID, VMID, and/or TR or PM; and
wherein speculative store-to-load forwarding-exploitive side channel attacks in which the load instruction in an attacker TC attempts to forward the store data from a victim store instruction that executes in a victim TC that is different from the attacker TC are mitigated.

13. The processor of claim 12, wherein the store dependence predictor is predictive, at least in part, because the prediction is made before making a full data address comparison of the load instruction with the store instruction.

14. The processor of claim 12, wherein the store dependence predictor is predictive, at least in part, because the prediction is made before verifying that the load instruction has permission to access the store data.

15. The processor of claim 12, further comprising:
update logic associated with the store dependence predictor that updates the store dependence predictor based on whether a load instruction speculatively forwarded data from a store instruction, whether the foregoing act or its absence was correct;
wherein the update logic uses the TC to access the store dependence predictor in order to perform said updates.

16. The processor of claim 12, wherein the comparing a TC indicated by an index, tag or entry of the store dependence predictor with the TC of the load instruction comprises comparing a hash and/or concatenation of the TC with other information.

17. The processor of claim 12, wherein the store dependence predictor is accessible by a hash or concatenation of the TC of the load instruction with an instruction address of the load instruction.

18. The processor of claim 12, wherein the signal selects between forwarding of the store data to the load instruction and not forwarding of the store data to the load instruction.

19. The processor of claim 12, wherein the signal selects between accessing and not accessing a store queue to forward the store data.

20. The processor of claim 12, wherein:
the store dependence predictor comprises a store queue; and
the generated signal comprises a signal that signals whether there was at least one entry in the store queue containing a TC and data address that matches that of the load instruction.

21. The processor of claim 12, wherein the store dependence predictor is accessed with an index and/or tag, and said using a TC of the load instruction comprises:
generating the index and/or tag by hashing or concatenating the TC with other information; and
accessing the store dependence predictor with the index and/or tag.

22. The processor of claim 12,
wherein the store dependence predictor comprises a content-addressable memory that holds TCs of each of a plurality of store instructions; and
wherein said prediction is also reflective of whether the TC of the load instruction matches the TC of any of the store instructions.

23. The processor of claim 12,
wherein the store dependence predictor comprises a store queue comprising a plurality of entries that are selectable; and
wherein the store queue is a content addressable memory that is accessed by camming the TC and a data address, or portion or derivative thereof, against the plurality of entries of the store queue.

24. A non-transitory computer-readable medium having instructions stored thereon that are capable of causing or configuring a processor for mitigating side channel attacks, the processor comprising:
a store dependence predictor that provides a prediction of whether a load instruction has a memory dependency on a store instruction that specifies store data that is or will be available to forward to the load instruction, wherein the store dependence predictor:
is accessible using an identifier and TC of the load instruction by comparing a TC indicated by an index, tag or entry of the store dependence predictor with the TC of the load instruction; and
generates a signal that reflects said prediction of whether the load instruction has a memory dependency on a store instruction that specifies store data that is available to forward to the load instruction;
wherein a TC comprises an ASID, VMID, PM or TR, a combination of two or more of the ASID, VMID, and TR or PM, or a hash and/or subset of the ASID, VMID, and/or TR or PM; and
wherein speculative store-to-load forwarding-exploitive side channel attacks in which the load instruction in an attacker TC attempts to forward the store data from a victim store instruction that executes in a victim TC that is different from the attacker TC are mitigated.

* * * * *